US012438495B2

(12) United States Patent
Nguyen et al.

(10) Patent No.: US 12,438,495 B2
(45) Date of Patent: Oct. 7, 2025

(54) ROOFING SYSTEM FOR PREVENTION OF ROOFING SHINGLE DEFORMATION

(71) Applicant: GAF Energy LLC, Parsippany, NJ (US)

(72) Inventors: Thierry Nguyen, San Francisco, CA (US); Ming-Liang Shiao, Collegeville, PA (US); Dan Hua, San Jose, CA (US); Matthew Grigsby, San Francisco, CA (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 18/970,114

(22) Filed: Dec. 5, 2024

(65) Prior Publication Data

US 2025/0183838 A1 Jun. 5, 2025

Related U.S. Application Data

(60) Provisional application No. 63/606,404, filed on Dec. 5, 2023.

(51) Int. Cl.
*E04D 1/34* (2006.01)
*H02S 20/25* (2014.01)

(52) U.S. Cl.
CPC ................ *H02S 20/25* (2014.12); *E04D 1/34* (2013.01); *E04D 2001/3423* (2013.01); *E04D 2001/3467* (2013.01)

(58) Field of Classification Search
CPC ................ E04D 2001/3423; E04D 2001/3467
See application file for complete search history.

(56) References Cited

U.S. PATENT DOCUMENTS

| | | | |
|---|---|---|---|
| 1,981,467 | A | 11/1934 | Radtke |
| 3,156,497 | A | 11/1964 | Lessard |
| 3,581,779 | A | 6/1971 | Gilbert, Jr. |
| 4,258,948 | A | 3/1981 | Hoffmann |

(Continued)

FOREIGN PATENT DOCUMENTS

| | | | |
|---|---|---|---|
| CA | 2829440 | A | 5/2019 |
| CH | 700095 | A2 | 6/2010 |

(Continued)

OTHER PUBLICATIONS

Sunflare, Procducts: “Sunflare Develops Prototype for New Residential Solar Shingles”; 2019 <<sunflaresolar.com/news/sunflare-develops-prototype-for-new-residential-solar-shingles>> retrieved Feb. 2, 2021.

(Continued)

*Primary Examiner* — Adriana Figueroa
(74) *Attorney, Agent, or Firm* — GREENBERG TRUARIG, LLP

(57) ABSTRACT

A system includes a plurality of photovoltaic shingles and a plurality of roofing shingles installed on a roof deck. Each of the roofing shingles includes a headlap portion and a nail zone on the headlap portion. The nail zone includes at least one nail receiving portion, and at least one opening defining a perimeter of at least a portion of the at least one nail receiving portion. Each of the roofing shingles is installed on the roof deck by at least one fastener, which extends through the at least one nail receiving portion.

20 Claims, 14 Drawing Sheets

(56) References Cited

U.S. PATENT DOCUMENTS 4,349,220 A 9/1982 Carroll et al.
4,499,702 A 2/1985 Turner
4,636,577 A 1/1987 Peterpaul
5,167,579 A 12/1992 Rotter
5,437,735 A 8/1995 Younan et al.
5,590,495 A 1/1997 Bressler et al.
5,642,596 A 7/1997 Waddington
5,671,577 A * 9/1997 Todd ........................ E04D 1/12 52/302.1
6,008,450 A 12/1999 Ohtsuka et al.
6,033,270 A 3/2000 Stuart
6,046,399 A 4/2000 Kapner
6,201,180 B1 3/2001 Meyer et al.
6,220,329 B1 4/2001 King et al.
6,308,482 B1 10/2001 Strait
6,320,114 B1 11/2001 Kuechler
6,320,115 B1 11/2001 Kataoka et al.
6,336,304 B1 1/2002 Mimura et al.
6,341,454 B1 1/2002 Koleoglou
6,407,329 B1 6/2002 Tino et al.
6,576,830 B2 6/2003 Nagao et al.
6,928,781 B2 8/2005 Desbois et al.
6,972,367 B2 12/2005 Federspiel et al.
7,138,578 B2 11/2006 Komamine
7,155,870 B2 1/2007 Almy
7,178,295 B2 2/2007 Dinwoodie
7,487,771 B1 2/2009 Eiffert et al.
7,587,864 B2 9/2009 McCaskill et al.
7,678,990 B2 3/2010 McCaskill et al.
7,678,991 B2 3/2010 McCaskill et al.
7,748,191 B2 7/2010 Podirsky
7,819,114 B2 10/2010 Augenbraun et al.
7,824,191 B1 11/2010 Podirsky
7,832,176 B2 11/2010 McCaskill et al.
8,118,109 B1 2/2012 Hacker
8,168,880 B2 5/2012 Jacobs et al.
8,173,889 B2 5/2012 Kalkanoglu et al.
8,210,570 B1 7/2012 Railkar et al.
8,261,505 B2 * 9/2012 Kalkanoglu .............. E04D 1/34 52/518
8,276,329 B2 10/2012 Lenox
8,307,599 B2 * 11/2012 Jenkins ..................... E04D 1/34 52/553
8,312,693 B2 11/2012 Cappelli
8,319,093 B2 11/2012 Kalkanoglu et al.
8,333,040 B2 12/2012 Shiao et al.
8,371,076 B2 2/2013 Jones et al.
8,375,653 B2 2/2013 Shiao et al.
8,404,967 B2 3/2013 Kalkanoglu et al.
8,410,349 B2 4/2013 Kalkanoglu et al.
8,418,415 B2 4/2013 Shiao et al.
8,438,796 B2 5/2013 Shiao et al.
8,453,410 B2 * 6/2013 Kalkanoglu .............. E04D 1/34 52/518
8,468,754 B2 6/2013 Railkar et al.
8,468,757 B2 6/2013 Krause et al.
8,499,518 B2 * 8/2013 Jenkins ..................... E04D 1/34 52/553
8,505,249 B2 8/2013 Geary
8,512,866 B2 8/2013 Taylor
8,513,517 B2 8/2013 Kalkanoglu et al.
8,586,856 B2 11/2013 Kalkanoglu et al.
8,601,754 B2 12/2013 Jenkins et al.
8,629,578 B2 1/2014 Kurs et al.
8,646,228 B2 2/2014 Jenkins
8,656,657 B2 2/2014 Livsey et al.
8,671,630 B2 3/2014 Lena et al.
8,677,702 B2 3/2014 Jenkins
8,695,289 B2 4/2014 Koch et al.
8,713,858 B1 5/2014 Xie
8,713,860 B2 5/2014 Railkar et al.
8,733,038 B2 5/2014 Kalkanoglu et al.
8,776,455 B2 7/2014 Azoulay
8,789,321 B2 7/2014 Ishida
8,793,940 B2 8/2014 Kalkanoglu et al.
8,793,941 B2 8/2014 Bosler et al.
8,826,607 B2 9/2014 Shiao et al.
8,835,751 B2 9/2014 Kalkanoglu et al.
8,863,451 B2 10/2014 Jenkins et al.
8,898,970 B2 12/2014 Jenkins et al.
8,925,262 B2 1/2015 Railkar et al.
8,943,766 B2 2/2015 Gombarick et al.
8,946,544 B2 2/2015 Jabos et al.
8,950,128 B2 2/2015 Kalkanoglu et al.
8,959,848 B2 2/2015 Jenkins et al.
8,966,838 B2 3/2015 Jenkins
8,966,850 B2 3/2015 Jenkins et al.
8,994,224 B2 3/2015 Mehta et al.
9,032,672 B2 5/2015 Livsey et al.
9,121,178 B2 9/2015 Belt et al.
9,153,950 B2 10/2015 Yamanaka et al.
9,166,087 B2 10/2015 Chihlas et al.
9,169,646 B2 10/2015 Rodrigues et al.
9,170,034 B2 10/2015 Bosler et al.
9,178,465 B2 11/2015 Shiao et al.
9,202,955 B2 12/2015 Livsey et al.
9,212,832 B2 12/2015 Jenkins
9,217,584 B2 12/2015 Kalkanoglu et al.
9,270,221 B2 2/2016 Zhao
9,273,885 B2 3/2016 Rodrigues et al.
9,276,141 B2 3/2016 Kalkanoglu et al.
9,331,224 B2 5/2016 Koch et al.
9,356,174 B2 5/2016 Duarte et al.
9,359,014 B1 6/2016 Yang et al.
9,412,890 B1 8/2016 Meyers
9,528,270 B2 12/2016 Jenkins et al.
9,605,432 B1 3/2017 Robbins
9,711,672 B2 7/2017 Wang
9,755,573 B2 9/2017 Livsey et al.
9,786,802 B2 10/2017 Shiao et al.
9,831,818 B2 11/2017 West
9,912,284 B2 3/2018 Svec
9,923,515 B2 3/2018 Rodrigues et al.
9,938,729 B2 4/2018 Coon
9,991,412 B2 6/2018 Gonzalez et al.
9,998,067 B2 6/2018 Kalkanoglu et al.
10,027,273 B2 7/2018 West et al.
10,115,850 B2 10/2018 Rodrigues et al.
10,128,660 B1 11/2018 Apte et al.
10,156,075 B1 12/2018 McDonough
10,187,005 B2 1/2019 Rodrigues et al.
10,256,765 B2 4/2019 Rodrigues et al.
10,284,136 B1 5/2019 Mayfield et al.
10,454,408 B2 10/2019 Livsey et al.
10,530,292 B1 1/2020 Cropper et al.
10,560,048 B2 2/2020 Fisher et al.
10,563,406 B2 2/2020 Kalkanoglu et al.
D879,031 S 3/2020 Lance et al.
10,579,028 B1 3/2020 Jacob
10,784,813 B2 9/2020 Kalkanoglu et al.
D904,289 S 12/2020 Lance et al.
11,012,026 B2 5/2021 Kalkanoglu et al.
11,085,187 B2 8/2021 Grubka et al.
11,177,639 B1 11/2021 Nguyen et al.
11,217,715 B2 1/2022 Sharenko et al.
11,251,744 B1 2/2022 Bunea et al.
11,258,399 B2 2/2022 Kalkanoglu et al.
11,283,394 B2 3/2022 Perkins et al.
11,309,828 B2 4/2022 Sirski et al.
11,394,344 B2 7/2022 Perkins et al.
11,424,379 B2 8/2022 Sharenko et al.
11,431,280 B2 8/2022 Liu et al.
11,431,281 B2 8/2022 Perkins et al.
11,444,569 B2 9/2022 Clemente et al.
11,454,027 B2 9/2022 Kuiper et al.
11,459,757 B2 10/2022 Nguyen et al.
11,486,144 B2 11/2022 Bunea et al.
11,489,482 B2 11/2022 Peterson et al.
11,496,088 B2 11/2022 Sirski et al.
11,508,861 B1 11/2022 Perkins et al.
11,512,480 B1 11/2022 Achor et al.
11,527,665 B2 12/2022 Boitnott
11,545,927 B2 1/2023 Abra et al.

(56) References Cited

U.S. PATENT DOCUMENTS

| | | | |
|---|---|---|---|
| 11,545,928 | B2 * | 1/2023 | Perkins .................... E04D 1/20 |
| 11,658,470 | B2 | 5/2023 | Nguyen et al. |
| 11,661,745 | B2 | 5/2023 | Bunea et al. |
| 11,689,149 | B2 | 6/2023 | Clemente et al. |
| 11,705,531 | B2 | 7/2023 | Sharenko et al. |
| 11,728,759 | B2 | 8/2023 | Nguyen et al. |
| 11,732,490 | B2 | 8/2023 | Achor et al. |
| 11,811,361 | B1 | 11/2023 | Farhangi et al. |
| 11,824,486 | B2 | 11/2023 | Nguyen et al. |
| 11,824,487 | B2 | 11/2023 | Nguyen et al. |
| 11,843,067 | B2 | 12/2023 | Nguyen et al. |
| 2002/0053360 | A1 | 5/2002 | Kinoshita et al. |
| 2002/0129849 | A1 | 9/2002 | Heckeroth |
| 2003/0101662 | A1 | 6/2003 | Ullman |
| 2003/0132265 | A1 | 7/2003 | Villela et al. |
| 2003/0217768 | A1 | 11/2003 | Guha |
| 2004/0000334 | A1 | 1/2004 | Ressler |
| 2005/0030187 | A1 | 2/2005 | Peress et al. |
| 2005/0115603 | A1 | 6/2005 | Yoshida et al. |
| 2005/0144870 | A1 | 7/2005 | Dinwoodie |
| 2005/0178428 | A1 | 8/2005 | Laaly et al. |
| 2005/0193673 | A1 | 9/2005 | Rodrigues et al. |
| 2006/0042683 | A1 | 3/2006 | Gangemi |
| 2006/0046084 | A1 | 3/2006 | Yang et al. |
| 2007/0074757 | A1 | 4/2007 | Mellott et al. |
| 2007/0181174 | A1 | 8/2007 | Ressler |
| 2007/0193618 | A1 | 8/2007 | Bressler et al. |
| 2007/0249194 | A1 | 10/2007 | Liao |
| 2007/0295385 | A1 | 12/2007 | Sheats et al. |
| 2008/0006323 | A1 | 1/2008 | Kalkanoglu et al. |
| 2008/0035140 | A1 | 2/2008 | Placer et al. |
| 2008/0078440 | A1 | 4/2008 | Lim et al. |
| 2008/0185748 | A1 | 8/2008 | Kalkanoglu |
| 2008/0271774 | A1 | 11/2008 | Kalkanoglu et al. |
| 2008/0302030 | A1 | 12/2008 | Stancel et al. |
| 2008/0315061 | A1 | 12/2008 | Fath |
| 2009/0000222 | A1 | 1/2009 | Kalkanoglu et al. |
| 2009/0014057 | A1 | 1/2009 | Croft et al. |
| 2009/0014058 | A1 | 1/2009 | Croft et al. |
| 2009/0019795 | A1 | 1/2009 | Szacsvay et al. |
| 2009/0044850 | A1 | 2/2009 | Kimberley |
| 2009/0114261 | A1 | 5/2009 | Stancel et al. |
| 2009/0133340 | A1 | 5/2009 | Shiao et al. |
| 2009/0159118 | A1 | 6/2009 | Kalkanoglu et al. |
| 2009/0178350 | A1 | 7/2009 | Kalkanoglu et al. |
| 2009/0229652 | A1 | 9/2009 | Mapel et al. |
| 2009/0275247 | A1 | 11/2009 | Richter et al. |
| 2010/0019580 | A1 | 1/2010 | Croft et al. |
| 2010/0095618 | A1 | 4/2010 | Edison et al. |
| 2010/0101634 | A1 | 4/2010 | Frank et al. |
| 2010/0116325 | A1 | 5/2010 | Nikoonahad |
| 2010/0131108 | A1 | 5/2010 | Meyer |
| 2010/0139184 | A1 | 6/2010 | Williams et al. |
| 2010/0146878 | A1 | 6/2010 | Koch et al. |
| 2010/0159221 | A1 | 6/2010 | Kourtakis et al. |
| 2010/0170169 | A1 | 7/2010 | Railkar et al. |
| 2010/0186798 | A1 | 7/2010 | Tormen et al. |
| 2010/0242381 | A1 | 9/2010 | Jenkins |
| 2010/0313499 | A1 | 12/2010 | Gangemi |
| 2010/0325976 | A1 | 12/2010 | DeGenfelder et al. |
| 2010/0326488 | A1 | 12/2010 | Aue et al. |
| 2010/0326501 | A1 | 12/2010 | Zhao et al. |
| 2011/0030761 | A1 | 2/2011 | Kalkanoglu et al. |
| 2011/0036386 | A1 | 2/2011 | Browder |
| 2011/0036389 | A1 | 2/2011 | Hardikar et al. |
| 2011/0048507 | A1 | 3/2011 | Livsey et al. |
| 2011/0058337 | A1 | 3/2011 | Han et al. |
| 2011/0061326 | A1 | 3/2011 | Jenkins |
| 2011/0100436 | A1 | 5/2011 | Cleereman et al. |
| 2011/0104488 | A1 | 5/2011 | Muessig et al. |
| 2011/0132427 | A1 | 6/2011 | Kalkanoglu et al. |
| 2011/0168238 | A1 | 7/2011 | Metin et al. |
| 2011/0239555 | A1 | 10/2011 | Cook et al. |
| 2011/0302859 | A1 | 12/2011 | Crasnianski |
| 2011/0314753 | A1 | 12/2011 | Farmer et al. |
| 2012/0034799 | A1 | 2/2012 | Hunt |
| 2012/0060434 | A1 | 3/2012 | Jacobs |
| 2012/0060902 | A1 | 3/2012 | Drake |
| 2012/0085392 | A1 | 4/2012 | Albert et al. |
| 2012/0137600 | A1 | 6/2012 | Jenkins |
| 2012/0176077 | A1 | 7/2012 | Oh et al. |
| 2012/0212065 | A1 | 8/2012 | Cheng et al. |
| 2012/0233940 | A1 | 9/2012 | Perkins et al. |
| 2012/0240490 | A1 | 9/2012 | Gangemi |
| 2012/0260977 | A1 | 10/2012 | Stancel |
| 2012/0266942 | A1 | 10/2012 | Komatsu et al. |
| 2012/0279150 | A1 | 11/2012 | Pislkak et al. |
| 2012/0282437 | A1 | 11/2012 | Clark et al. |
| 2012/0291848 | A1 | 11/2012 | Sherman et al. |
| 2012/0297716 | A1 | 11/2012 | Kalkanoglu et al. |
| 2013/0008499 | A1 | 1/2013 | Verger et al. |
| 2013/0014455 | A1 | 1/2013 | Grieco |
| 2013/0118558 | A1 | 5/2013 | Sherman |
| 2013/0193769 | A1 | 8/2013 | Mehta et al. |
| 2013/0247988 | A1 | 9/2013 | Reese et al. |
| 2013/0284267 | A1 | 10/2013 | Plug et al. |
| 2013/0306137 | A1 | 11/2013 | Ko |
| 2014/0090697 | A1 | 4/2014 | Rodrigues et al. |
| 2014/0150843 | A1 | 6/2014 | Pearce et al. |
| 2014/0173997 | A1 | 6/2014 | Jenkins |
| 2014/0179220 | A1 | 6/2014 | Railkar et al. |
| 2014/0182222 | A1 | 7/2014 | Kalkanoglu et al. |
| 2014/0208675 | A1 | 7/2014 | Beerer et al. |
| 2014/0254776 | A1 | 9/2014 | O'Connor et al. |
| 2014/0266289 | A1 | 9/2014 | Della Sera et al. |
| 2014/0311556 | A1 | 10/2014 | Feng et al. |
| 2014/0352760 | A1 | 12/2014 | Haynes et al. |
| 2014/0366464 | A1 | 12/2014 | Rodrigues et al. |
| 2015/0089895 | A1 | 4/2015 | Leitch |
| 2015/0162459 | A1 | 6/2015 | Lu et al. |
| 2015/0340516 | A1 | 11/2015 | Kim et al. |
| 2015/0349173 | A1 | 12/2015 | Morad et al. |
| 2016/0105144 | A1 | 4/2016 | Haynes et al. |
| 2016/0142008 | A1 | 5/2016 | Lopez et al. |
| 2016/0254776 | A1 | 9/2016 | Rodrigues et al. |
| 2016/0276508 | A1 | 9/2016 | Huang et al. |
| 2016/0359451 | A1 | 12/2016 | Mao et al. |
| 2017/0159292 | A1 | 6/2017 | Chihlas et al. |
| 2017/0179319 | A1 | 6/2017 | Yamashita et al. |
| 2017/0179726 | A1 | 6/2017 | Garrity et al. |
| 2017/0237390 | A1 | 8/2017 | Hudson et al. |
| 2017/0331415 | A1 | 11/2017 | Koppi et al. |
| 2018/0094438 | A1 | 4/2018 | Wu et al. |
| 2018/0097472 | A1 | 4/2018 | Anderson et al. |
| 2018/0115275 | A1 | 4/2018 | Flanigan et al. |
| 2018/0254738 | A1 | 9/2018 | Yang et al. |
| 2018/0294765 | A1 | 10/2018 | Friedrich et al. |
| 2018/0351502 | A1 | 12/2018 | Almy et al. |
| 2018/0367089 | A1 | 12/2018 | Stutterheim et al. |
| 2019/0030867 | A1 | 1/2019 | Sun et al. |
| 2019/0081436 | A1 | 3/2019 | Onodi et al. |
| 2019/0123679 | A1 | 4/2019 | Rodrigues et al. |
| 2019/0253022 | A1 | 8/2019 | Hardar et al. |
| 2019/0305717 | A1 | 10/2019 | Allen et al. |
| 2020/0109320 | A1 | 4/2020 | Jiang |
| 2020/0144958 | A1 | 5/2020 | Rodrigues et al. |
| 2020/0220819 | A1 | 7/2020 | Vu et al. |
| 2020/0224419 | A1 | 7/2020 | Boss et al. |
| 2020/0256064 | A1 * | 8/2020 | Nagatsu .................... E04D 1/28 |
| 2020/0343397 | A1 | 10/2020 | Hem-Jensen |
| 2021/0083619 | A1 | 3/2021 | Hegedus |
| 2021/0115223 | A1 | 4/2021 | Bonekamp et al. |
| 2021/0159353 | A1 | 5/2021 | Li et al. |
| 2021/0301536 | A1 | 9/2021 | Baggs et al. |
| 2021/0343886 | A1 | 11/2021 | Sharenko et al. |
| 2022/0060141 | A1 | 2/2022 | Felton |
| 2022/0149213 | A1 | 5/2022 | Mensink et al. |
| 2023/0018987 | A1 | 1/2023 | Nguyen et al. |

FOREIGN PATENT DOCUMENTS

| | | | |
|---|---|---|---|
| CN | 202797032 | U | 3/2013 |
| CN | 217150978 | U | 8/2022 |
| DE | 1958248 | A1 | 11/1971 |

(56) References Cited

FOREIGN PATENT DOCUMENTS

| | | | |
|---|---|---|---|
| EP | 1039361 | A1 | 9/2000 |
| EP | 1837162 | A1 | 9/2007 |
| EP | 1774372 | A1 | 7/2011 |
| EP | 2446481 | A2 | 5/2012 |
| EP | 2784241 | A1 | 10/2014 |
| EP | 3772175 | A1 | 2/2021 |
| JP | 10046767 | A | 2/1998 |
| JP | 2002-106151 | A | 4/2002 |
| JP | 2001-098703 | A | 10/2002 |
| JP | 2017-027735 | A | 2/2017 |
| JP | 2018053707 | A | 4/2018 |
| KR | 20090084060 | A | 8/2009 |
| KR | 10-1348283 | B1 | 1/2014 |
| KR | 10-2019-0000367 | A | 1/2019 |
| KR | 10-2253483 | B1 | 5/2021 |
| NL | 2026856 | B1 | 6/2022 |
| WO | 2010/151777 | A2 | 12/2010 |
| WO | 2011/049944 | A1 | 4/2011 |
| WO | 2015/133632 | A1 | 9/2015 |
| WO | 2018/000589 | A1 | 1/2018 |
| WO | 2019/201416 | A1 | 10/2019 |
| WO | 2020-159358 | A1 | 8/2020 |
| WO | 2021-247098 | A1 | 12/2021 |

OTHER PUBLICATIONS

RGS Energy, 3.5kW Powerhouse 3.0 system installed in an afternoon; Jun. 7, 2019 <<facebook.com/RGSEnergy/>> retrieved Feb. 2, 2021.

Tesla, Solar Roof <<tesla.com/solarroof>> retrieved Feb. 2, 2021.

"Types of Roofing Underlayment", Owens Corning Roofing; <<https://www.owenscorning.com/en-us/roofing/tools/how-roofing-underlayment-helps-protect-your-home>> retrieved Nov. 1, 2021.

* cited by examiner

ROOFING SYSTEM FOR PREVENTION OF ROOFING SHINGLE DEFORMATION

CROSS-REFERENCE TO RELATED APPLICATION

This application is a Section 111(a) application relating to and claiming the benefit of commonly owned, U.S. Provisional Patent Application Ser. No. 63/606,404, filed Dec. 5, 2023, entitled "ROOFING SYSTEM INCLUDING ROOFING SHINGLES," the contents of which is incorporated herein by reference in its entirety.

FIELD

The present invention relates to a roofing system, and more specifically to a roofing system that includes photovoltaic shingles and roofing shingles installed on a roof deck.

BACKGROUND

In a known roofing system, a roof deck includes roofing shingles installed by a roofer. The roofing system may include photovoltaic roofing shingles, as well as non-photovoltaic, non-asphaltic roofing shingles.

SUMMARY

The Claims, rather than the Summary, define covered embodiments of the present invention. The Summary is a high-level overview of various aspects of the invention, and introduces concepts that are further described in the Detailed Description below. The Summary is not intended to identify key or essential features of the claimed subject matter, and also is not intended to be used in isolation to determine the scope of the claimed subject matter. Instead, the claimed subject matter should be understood by reference to appropriate portions of the Specification and drawings, as well as to each claim.

In some embodiments, a system includes a plurality of photovoltaic shingles installed on a roof deck; and a plurality of roofing shingles installed on the roof deck proximate the plurality of photovoltaic shingles, wherein each of the plurality of roofing shingles includes a headlap portion, and a nail zone on the headlap portion, wherein the nail zone includes at least one nail receiving portion, and at least one opening defining a perimeter of at least a portion of the at least one nail receiving portion, wherein each of the plurality of roofing shingles is installed on the roof deck by at least one fastener, and wherein the at least one fastener extends through the at least one nail receiving portion.

In some embodiments, the at least one opening comprises a plurality of openings. In some embodiments, the at least one opening comprises at least a first opening and a second opening. In some embodiments, the at least one nail receiving portion has a circular shape. In some embodiments, the at least one opening includes a first plurality of openings arranged in a first circular pattern. In some embodiments, the at least one opening includes a second plurality of openings arranged in a second circular pattern, and wherein the first circular pattern and the second circular pattern are concentric with one another. In some embodiments, the second circular pattern surrounds the first circular pattern, and wherein the first circular pattern surrounds the at least one nail receiving portion. In some embodiments, each of the first plurality of openings and each of the second plurality of openings is accurate-shaped.

In some embodiments, the at least one opening includes a third plurality of openings arranged in a third circular pattern, and wherein the first circular pattern, the second circular pattern, and the third circular pattern are concentric with one another. In some embodiments, the third circular pattern surrounds the second circular pattern.

In some embodiments, each of the plurality of roofing shingles includes an upper surface and a lower surface, and wherein the at least one nail receiving portion is on the upper surface. In some embodiments, the at least one opening extends from the upper surface to the lower surface. In some embodiments, the at least one opening is within the upper surface. In some embodiments, the at least one opening is an embossed portion. In some embodiments, a thickness of the at least one nail receiving portion is greater than a thickness of the embossed portion.

In some embodiments, each of the plurality of roofing shingles is composed of a polymer. In some embodiments, each of the plurality of roofing shingles is composed of thermoplastic polyolefin (TPO). In some embodiments, each of the plurality of roofing shingles is composed of metal.

In some embodiments, a system includes a plurality of photovoltaic shingles installed on a roof deck; and a plurality of roofing shingles installed on the roof deck proximate the plurality of photovoltaic shingles, wherein each of the plurality of roofing shingles includes a headlap portion, a plurality of ribs on the headlap portion, and a nail zone on the headlap portion proximate to the plurality of ribs, wherein the nail zone includes at least one nail receiving portion, and at least one opening defining a perimeter of at least a portion of the at least one nail receiving portion, wherein each of the plurality of roofing shingles is installed on the roof deck by at least one fastener, and wherein the at least one fastener extends through the at least one nail receiving portion.

In some embodiments, a system includes a plurality of photovoltaic shingles installed on a roof deck; and a plurality of roofing shingles installed on the roof deck proximate the plurality of photovoltaic shingles, wherein each of the plurality of roofing shingles includes an upper surface and a lower surface, a headlap portion, and a nail zone on the headlap portion, wherein the nail zone includes at least one nail receiving portion, at least one opening defining at least a first portion of a perimeter of at least a first portion of the at least one nail receiving portion, wherein the at least one opening extends from the upper surface to the lower surface, and at least one embossed portion within the upper surface defining at least a second portion of the perimeter of at least a second portion of the at least one nail receiving portion, wherein each of the plurality of roofing shingles is installed on the roof deck by at least one fastener, and wherein the at least one fastener extends through the at least one nail receiving portion.

BRIEF DESCRIPTION OF THE FIGURES

This section refers to the drawings that form a part of this disclosure, and which illustrate some of the embodiments of structure, materials, and/or methods of the present invention described herein.

DETAILED DESCRIPTION

Figure 1:
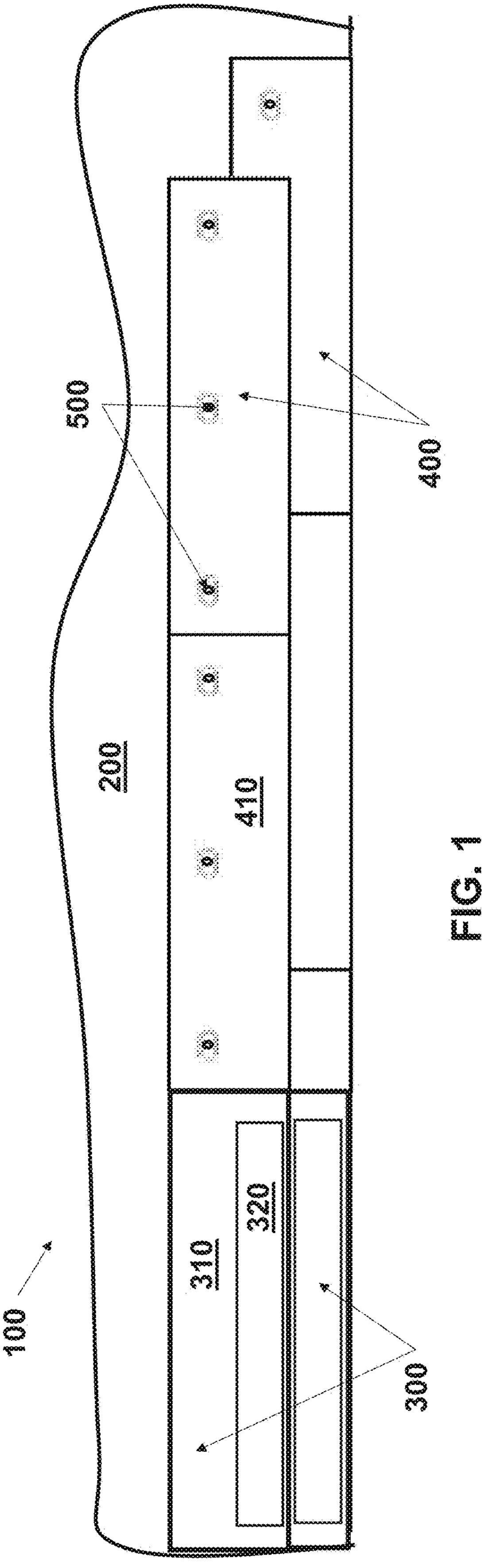
FIG. 1 shows a schematic top view of a roofing system including a partially-roofed roof deck, according to some embodiments of the invention.

In addition to the benefits and improvements that the Specification discloses, other objects and advantages that the Specification provides will become apparent from the following description taken in conjunction with the accompanying figures. Although the description discloses and describes detailed embodiments of the present disclosure, the disclosed embodiments are merely illustrative of the disclosure that may be embodied in various forms. In addition, each of the examples given regarding the various embodiments of the disclosure are intended to be illustrative, and not restrictive.

As used herein, a "steep slope" roof or roof deck is a roof or roof deck having a pitch of Y/X, where Y and X are in a ratio of 4:12 to 20:12, where Y corresponds to the "rise" of the roof or roof deck, and where X corresponds to the "run" of the roof or roof deck.

As used herein, a "sloped" roof or roof deck includes a roof or roof deck with a pitch that is less than that of a steep slope roof or roof deck, but which is not a flat roof or roof deck.

In some embodiments, the roofing system of the present invention includes a plurality of photovoltaic roofing shingles. In some embodiments, the photovoltaic roofing shingle includes a structure, composition, component, and/or function similar to those of one or more embodiments of the photovoltaic modules and shingles disclosed, shown, and/or described in any or all of: U.S. application Ser. No. 17/831,307, filed Jun. 2, 2022, titled "Roofing Module System," and published under U.S. Patent Application Publication No. 2022-0393637 on Dec. 8, 2022; U.S. application Ser. No. 18/169,718, filed Feb. 15, 2023, titled "Roofing Module System," and published under U.S. Patent Application Publication No. 2023-0203815 on Jun. 29, 2023; PCT International Patent Publication No. WO 2022/051593, Application No. PCT/US2021/049017, published Mar. 10, 2022, titled "Building Integrated Photovoltaic System," owned by GAF Energy LLC; and/or U.S. Pat. No. 11,251,744 to Bunea et al., issued Feb. 15, 2022, titled "Photovoltaic Shingles and Methods of Installing Same"; and the disclosures of each of which are incorporated by reference herein in their entireties.

In some embodiments, the roofing system of the present invention includes a plurality of roofing shingles. In some embodiments, the roofing system of the present invention includes a plurality of non-asphaltic roofing shingles. In some embodiments, the roofing shingle is a non-photovoltaic module. In some embodiments, the roofing shingle is a photovoltaic module. In some embodiments, the roofing shingle is a building integrated photovoltaic shingle. In some embodiments, the roofing shingle is a cuttable roofing module. In some embodiments, the roofing shingle is a nailable roofing module. In some embodiments, the roofing shingle includes a structure, composition, component, and/or function similar to those of one or more embodiments of roofing shingles or roofing modules disclosed, shown, and/or described in either or both of U.S. application Ser. No. 17/831,307, filed Jun. 2, 2022, titled "Roofing Module System," and published under U.S. Patent Application Publication No. 2022/0393637 on Dec. 8, 2022; and/or U.S. application Ser. No. 18/169,718, filed Feb. 15, 2023, titled "Roofing Module System," and published under U.S. Patent Application Publication No. 2023/0203815 on Jun. 29, 2023; and/or U.S. application Ser. No. 18/352,894, filed Jul. 14, 2023, titled "Solar Roofing System with Fiber Composite Roofing Shingles," and published under U.S. Patent Application Publication No. 2024/0018781 on Jan. 18, 2025, the disclosures of each of which are incorporated by reference herein in their entireties.

In some embodiments, the roofing system includes at least one photovoltaic roofing shingle, and/or at least one non-asphaltic roofing shingle, installed on a roof deck. In some embodiments, the roofing system includes one or more photovoltaic roofing shingles, and/or one or more non-asphaltic roofing shingles, installed on the roof deck. In some embodiments, the roof deck is a sloped roof deck. In some embodiments, the roofing system includes a plurality of photovoltaic roofing shingles, and/or a plurality of non-asphaltic roofing shingles, installed on the roof deck. In some embodiments, the roof deck is a sloped roof deck. In some embodiments, the roof deck is a steep slope roof deck.

Although the drawings show and the description describes examples of embodiments of the present invention, it is to be understood that one or more components from any embodiment may be used with and/or in place of one or more components from any other embodiment or embodiments.

Figure 2:
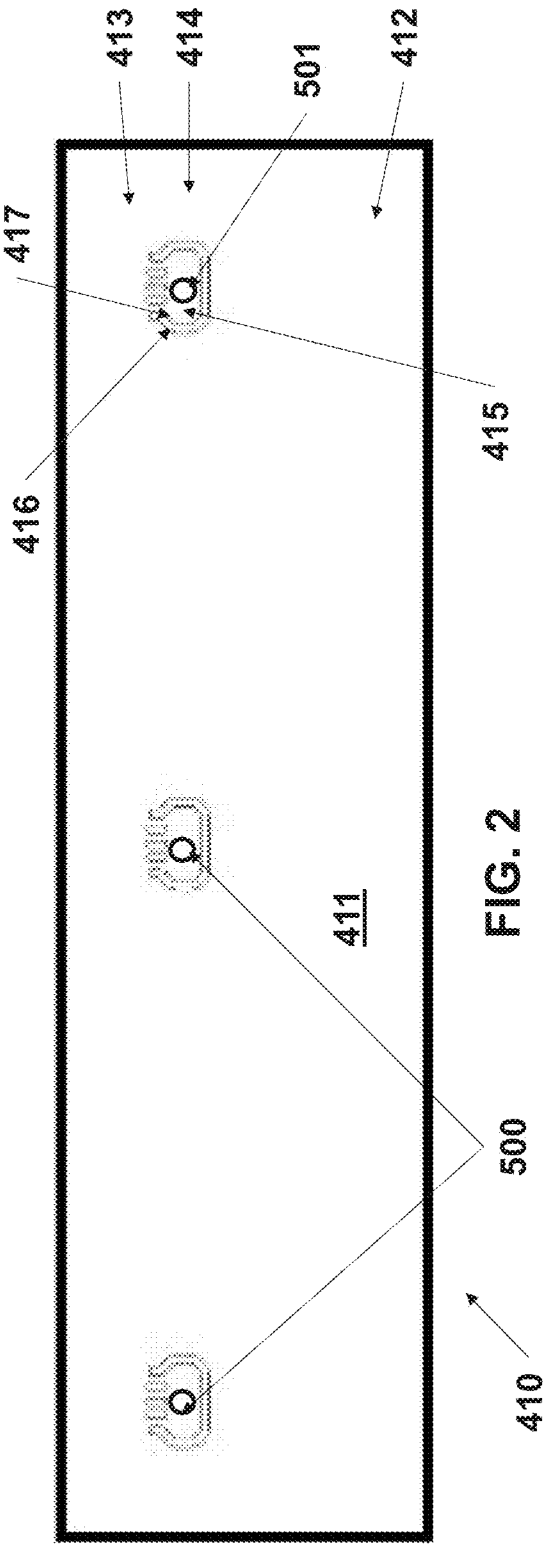
FIG. 2 shows a schematic top view of a non-asphaltic roofing shingle of the roofing system of FIG. 1, according to some embodiments of the invention.
Figure 3:
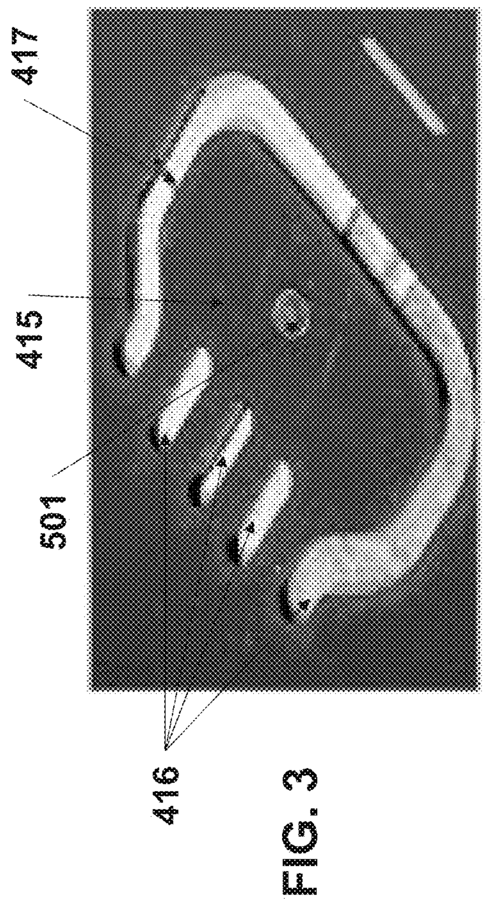
FIG. 3 shows a schematic detail view of a portion of the non-asphaltic roofing shingle of FIGS. 1 and 2, according to some embodiments of the invention.

With reference to the drawings, FIG. 1 shows a schematic top view of a roofing system including a partially-roofed roof deck, FIG. 2 shows a schematic top view of a non-asphaltic roofing shingle of the roofing system of FIG. 1, and FIG. 3 shows a schematic detail view of a portion of the non-asphaltic roofing shingle of FIGS. 1 and 2, in accordance with some embodiments of the invention. As the figures show, in some embodiments, a roofing system 100 includes a roof deck 200. In some embodiments, as the figures show, the roofing system includes a plurality of photovoltaic roofing shingles 300 installed on the roof deck 200. In some embodiments, the roofing system includes a plurality of non-asphaltic roofing shingles 400 installed on the roof deck 200, adjacent or proximate to the plurality of photovoltaic roofing shingles 300. It is to be understood, however, that in some embodiments, the roofing system 100 omits either the plurality of photovoltaic roofing shingles 300 and/or the plurality of non-asphaltic roofing shingles 400. Further, in some embodiments, the roofing system 100 includes one or more other components in place of and/or in addition to either or both of the plurality of photovoltaic roofing shingles 300 and/or the plurality of non-asphaltic roofing shingles 400. As FIGS. 1-3 illustrate, in some embodiments, one or more, or all of, the photovoltaic roofing shingles 300 includes a backsheet 310, and at least one solar cell 320 above the backsheet.

As FIGS. 1 through 3 illustrate, the plurality of non-asphaltic roofing shingles 400 includes at least a first non-asphaltic roofing shingle 410. In some embodiments, the first non-asphaltic roofing shingle 410 includes a first layer 411. In some embodiments, the first layer 411 includes a reveal portion 412, a headlap portion 413, and a nail zone 414 on the headlap portion 413. In some embodiments, the nail zone 414 includes at least one nail receiving portion 415. In some embodiments, at least one opening 416 defines at least a portion of a perimeter 417 of the at least one nail receiving portion 415. In some embodiments, the at least one nail receiving portion 415 is a tab extending within the at least one opening 416.

It is to be understood that for this embodiment, and/or any or all of the subsequently shown and described embodiments, one or more of the non-asphaltic roofing shingles, such as but not limited to the non-asphaltic roofing shingles 400 and/or the first non-asphaltic roofing shingle 410, may include more than one layer, and may include two layers, three layers, four layers, or more than four layers.

Further, it is to be understood that for this embodiment, and/or any or all of the subsequently shown and described embodiments, although the figures show three nail receiving portions 415, one or more of the non-asphaltic roofing shingles, such as but not limited to the non-asphaltic roofing shingles 400 and/or the first non-asphaltic roofing shingle 410, may include one, two, three, four, five, six, seven, eight, or more than eight nail receiving portions 415.

In some embodiments, the roofing system 100 includes a plurality of fasteners 500. For example, as FIGS. 1 through 3 show, in some embodiments, the plurality of fasteners 500 includes at least a first fastener 501. In some embodiments, the first fastener 501 extends through the at least one nail receiving portion 415 and the roof deck 200, thereby to install the first non-asphaltic roofing shingle 410 to the roof deck 200. Although the figures show only one fastener 500 in each of the nail receiving portions 415, it is to be understood that for this embodiment, and/or any or all of the subsequently shown and described embodiments, any or all of the nail receiving portion 415 may include more than one fastener 500. In some embodiments, the fasteners 500 may include one or more of nails, screws, rivets, staples, bolts, and/or clips, and/or combinations thereof. In some embodiments, one or more of the fasteners 500 may be installed through the backsheet 310 of the one or more of the photovoltaic roofing shingles 300, thereby installing the one or more photovoltaic roofing shingles 300 to the roof deck 200 in the roofing system 100.

As shown in FIG. 3, in some embodiments, at least a portion of the perimeter 417 of the nail receiving portion 415 is defined by the at least one opening 416. Also as shown, in some embodiments, the at least one opening 416 comprises a plurality of openings 416. As further shown, in some embodiments, the plurality of opening 416 includes one or more linear openings 416. Although FIG. 3 shows an embodiment with three linear openings 416, It is understood that the at least one opening 416 may include one, two, three, four, five, six, or more than six linear openings 416. In some embodiments, each of the openings 416 has a rounded rectangle shape. In some embodiments, each of the openings 416 has a rectangle shape. In some embodiments, each of the openings 416 has a square shape. In some embodiments, each of the openings 416 has a circular shape. In some embodiments, each of the openings 416 has a triangular shape. In some embodiments, each of the openings 416 has an oval shape. In some embodiments, each of the openings 416 has an elliptical shape.

Figure 4:
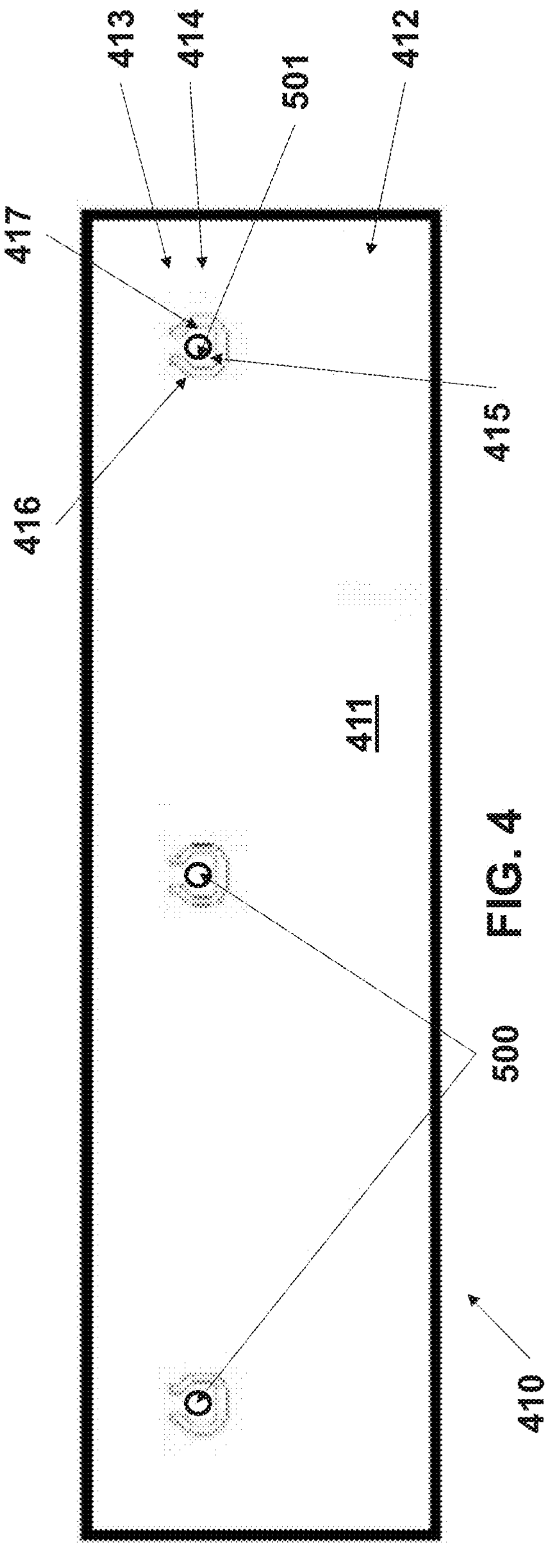
FIG. 4 shows a schematic top view of a non-asphaltic roofing shingle, according to some embodiments of the invention.
Figure 5:
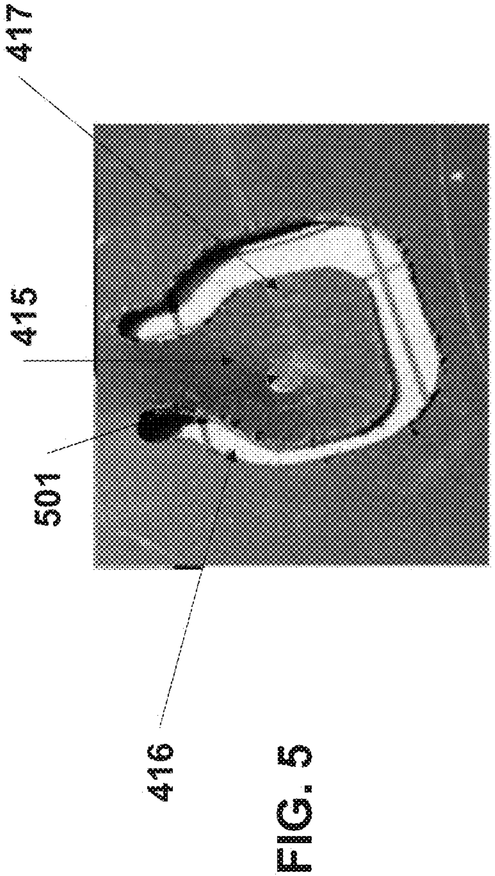
FIG. 5 shows a schematic detail view of a portion of the non-asphaltic roofing shingle of FIG. 4, according to some embodiments of the invention.

FIG. 4 shows a schematic top view of a non-asphaltic roofing shingle 410 installed on the roof deck 200 in the roofing system 100, and FIG. 5 shows a schematic detail view of a portion of the non-asphaltic roofing shingle 410 of FIG. 4, in accordance with some embodiments of the invention. In some embodiments, as FIGS. 4 and 5 show, the first non-asphaltic roofing shingle 410 includes the first layer 411. In some embodiments, the first layer 411 includes the reveal portion 412, the headlap portion 413, and the nail zone 414 on the headlap portion 413. In some embodiments, the nail zone 414 includes the at least one nail receiving portion 415. In some embodiments, the at least one opening 416 defines at least a portion of the perimeter 417 of the at least one nail receiving portion 415. In the embodiment that FIGS. 4 and 5 show, the nail zone 414 omits some of the openings 416 from the embodiment shown in FIGS. 1 through 3. In some embodiments, the nail zone 414 may include more or fewer openings 416 than shown in any of FIGS. 1 through 5, however.

In some embodiments, the opening 416 provides an open area for stress relief on the material of the nail receiving portion 415 and in turn stress relief on the fastener 500, so as to prevent the shingle 410 from deforming, buckling or warping, particularly in the area of the fasteners 500.

Figure 6:
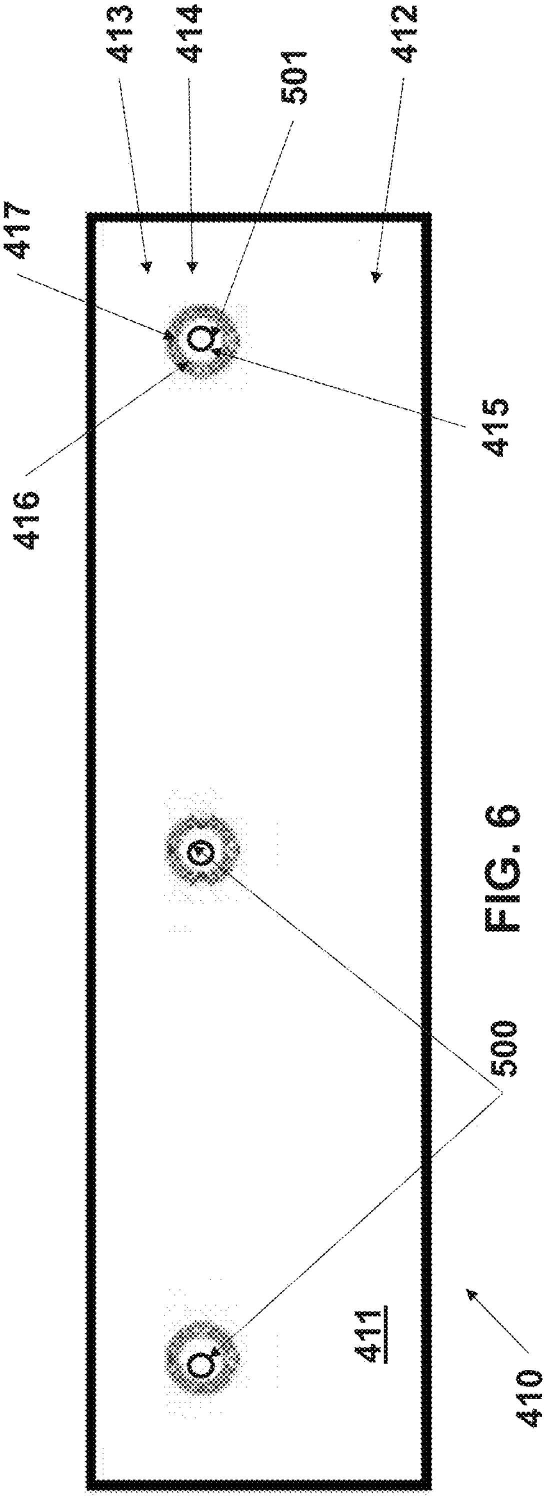
FIG. 6 shows a schematic top view of a non-asphaltic roofing shingle, according to some embodiments of the invention.
Figure 7:
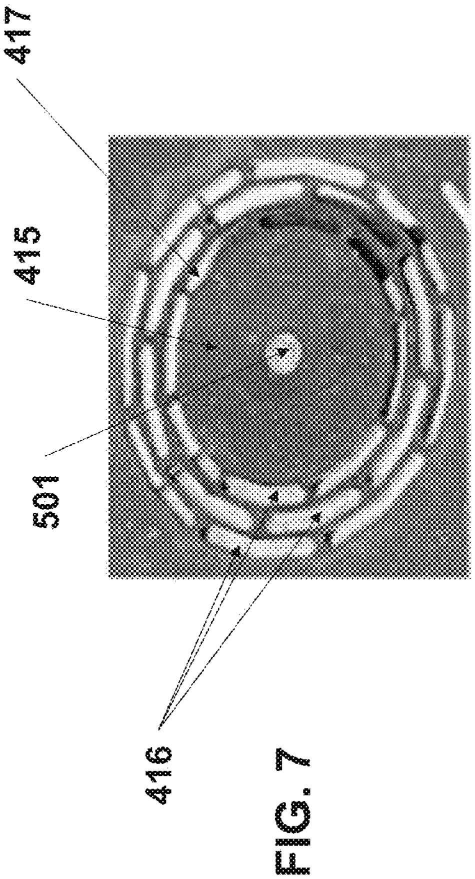
FIG. 7 shows a schematic detail view of a portion of the non-asphaltic roofing shingle of FIG. 6, according to some embodiments of the invention.

FIG. 6 shows a schematic top view of a non-asphaltic roofing shingle 410 installed on the roof deck 200 in the roofing system 100, and FIG. 7 shows a schematic detail view of a portion of the non-asphaltic roofing shingle 410 of FIG. 6, in accordance with some embodiments of the invention. In some embodiments, as FIGS. 6 and 7 show, the first non-asphaltic roofing shingle 410 includes the first layer 411. In some embodiments, the first layer 411 includes the reveal portion 412, the headlap portion 413, and the nail zone 414 on the headlap portion 413. In some embodiments, the nail zone 414 includes the at least one nail receiving portion 415. In some embodiments, the at least one opening 416 defines at least a portion of the perimeter 417 of the at least one nail receiving portion 415. As shown in FIGS. 6 and 7, in some embodiments, the nail receiving portions 415 are circular in shape. It is to be understood, however, that the nail receiving portions 415 may be other shapes, such as but not limited to elliptical, oval, triangular, square, rectangular, pentagonal, hexagonal, heptagonal, octagonal, and/or other polygonal shapes, and/or combinations thereof, as well as other shapes.

In the embodiment that FIGS. 4 and 5 show, the nail zone 414 includes the plurality of openings 416. In some embodiments, the plurality of openings 416 is arranged in at least one circular pattern. In some embodiments, the plurality of openings 416 is arranged in a plurality of circular patterns. In some embodiments, the plurality of circular patterns is a plurality of concentric circular patterns. In some embodiments, each of the plurality of openings 416 is arc shaped. In some embodiments, the plurality of openings 416 is two sets of concentric, arcuate openings 416. In some embodiments, the plurality of openings 416 is three sets of concentric, arcuate openings 416. In some embodiments, the plurality of openings 416 is four sets of concentric, arcuate openings 416. In some embodiments, the plurality of openings 416 is five sets of concentric, arcuate openings 416. In some embodiments, the plurality of openings 416 is more than five sets of concentric, arcuate openings 416.

In some embodiments, as the figures show, each of the sets of arcuate openings 416 has a different radius than the other sets of arcuate openings 416. In some embodiments, there are one, two, four, five, or more than five sets of arcuate openings 416. In some embodiments, the sets of arcuate openings 416 have the same center point. In some embodiments, two or more sets of arcuate openings 416 have different center points. In some embodiments, two or more of the arcuate openings 416 are the same size. In some embodiments, two or more of the arcuate openings 416 are different sizes.

In some embodiments, the nail zone 414 may include more or fewer openings 416 than shown in any of the disclosed embodiments. In some embodiments, the roofing system 100 may include one or more of the non-asphaltic roofing shingles 400 in accordance with one or more of the disclosed embodiments, with or without the photovoltaic roofing shingles 300, and/or with or without one or more additional components.

In some embodiments, the openings 416 provide areas of stress relief on the material of the nail receiving portions 415 and in turn stress relief on the fasteners 500, so as to prevent the shingle 410 from deforming, buckling or warping, particularly in the area of the fasteners 500.

Figure 8:
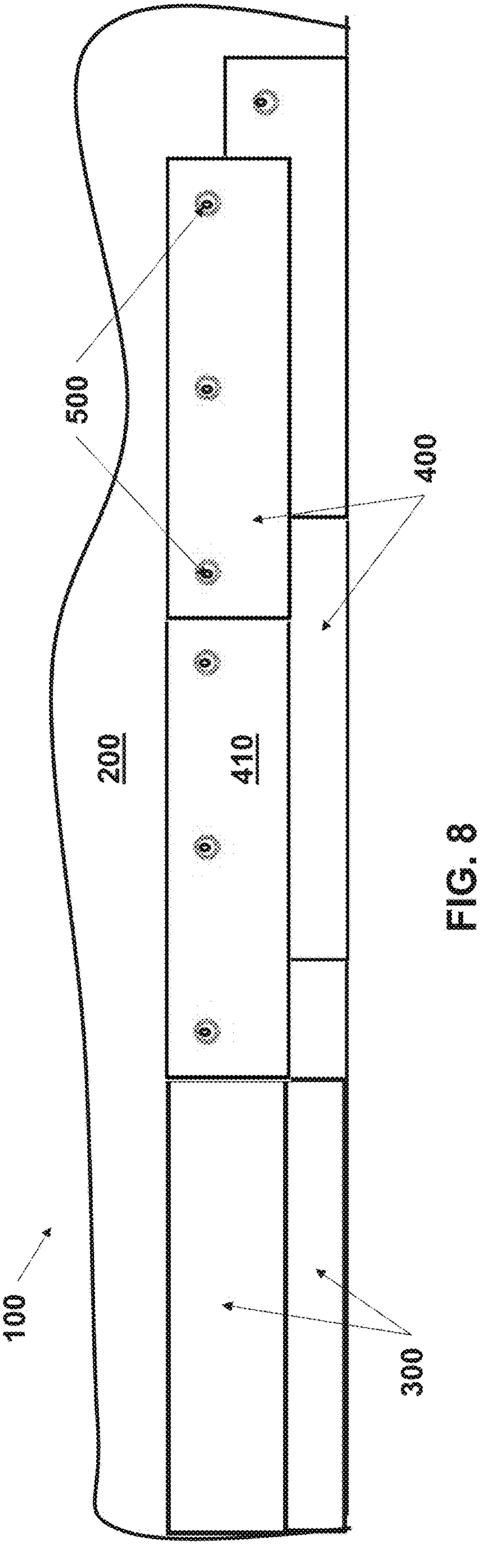
FIG. 8 shows a schematic top view of a roofing system including a partially-roofed roof deck, according to some embodiments of the invention.
Figure 9:
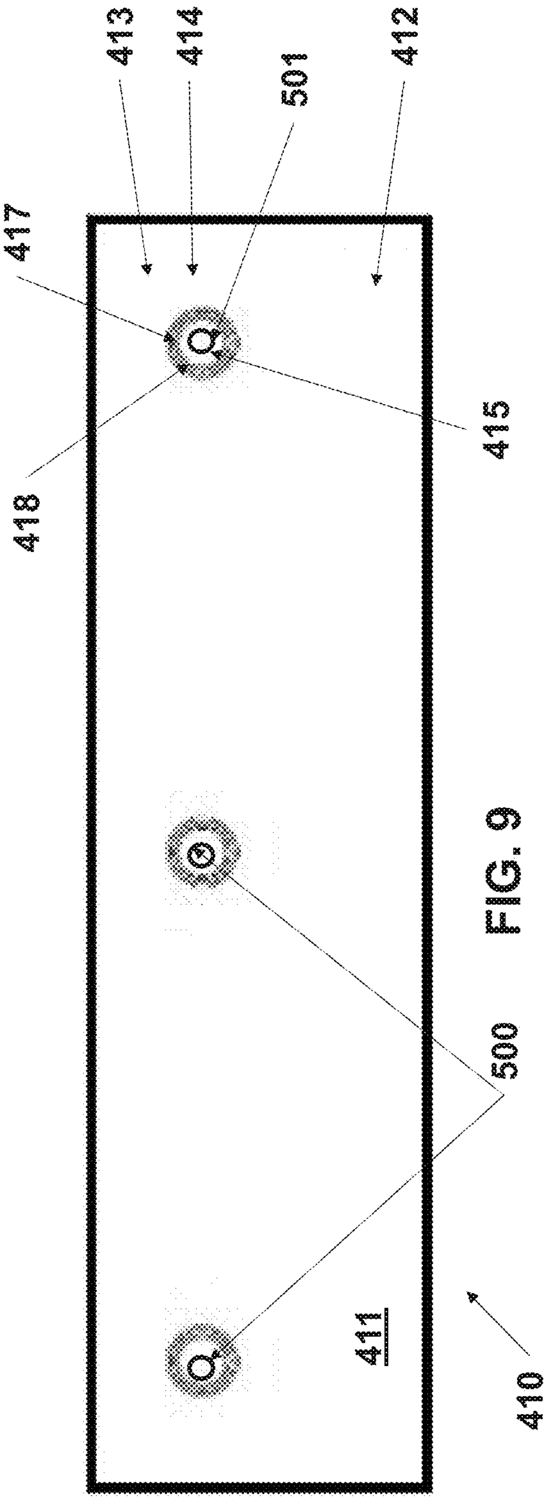
FIG. 9 shows a schematic top view of a non-asphaltic roofing shingle of the roofing system of FIG. 8, according to some embodiments of the invention.
Figure 10:
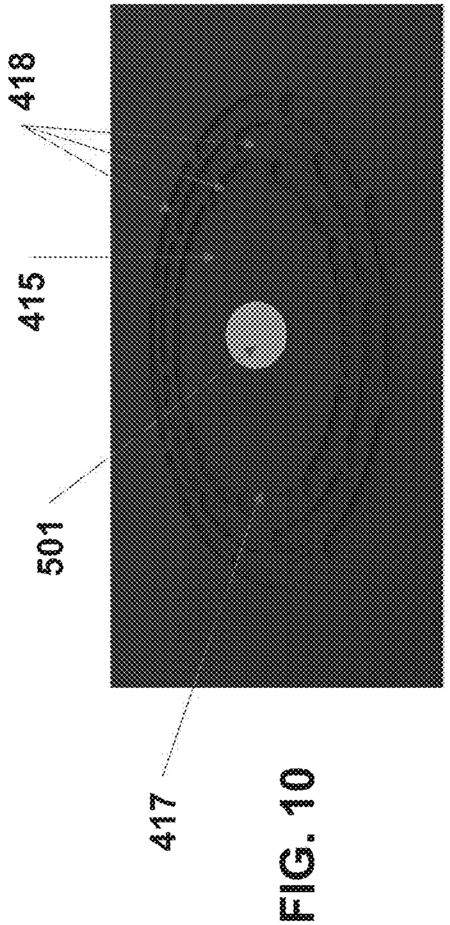
FIG. 10 shows a schematic detail view of a portion of the non-asphaltic roofing shingle of FIGS. 8 and 9, according to some embodiments of the invention.

FIG. 8 shows a schematic top view of a roofing system including a partially-roofed roof deck, FIG. 9 shows a schematic top view of a non-asphaltic roofing shingle of the roofing system of FIG. 8, and FIG. 10 shows a schematic detail view of a portion of the non-asphaltic roofing shingle of FIGS. 8 and 9, in accordance with some embodiments. As the figures show, in some embodiments, the roofing system 100 includes the roof deck 200. In some embodiments, as the figures show, the roofing system includes the plurality of photovoltaic roofing shingles 300 installed on the roof deck 200. In some embodiments, the roofing system includes the plurality of non-asphaltic roofing shingles 400 installed on the roof deck 200, adjacent to the plurality of photovoltaic roofing shingles 300. It is to be understood, however, that in some embodiments, the roofing system 100 omits either the plurality of photovoltaic roofing shingles 300 and/or the plurality of non-asphaltic roofing shingles 400. Further, in some embodiments, the roofing system 100 includes one or more other components in place of and/or in addition to either or both of the plurality of photovoltaic roofing shingles 300 and/or the plurality of non-asphaltic roofing shingles 400.

As FIGS. 8 through 10 illustrate, in some embodiments, the plurality of non-asphaltic roofing shingles 400 includes at least the first non-asphaltic roofing shingle 410. In some embodiments, the first non-asphaltic roofing shingle 410 includes the first layer 411. In some embodiments, the first layer 411 includes the reveal portion 412, the headlap portion 413, and the nail zone 414 on the headlap portion 413. In some embodiments, the nail zone 414 includes the at least one nail receiving portion 415.

As shown in FIGS. 8 through 10, in some embodiments, at least one embossed portion 418 defines at least a portion of the perimeter 417 of the at least one nail receiving portion 415. In some embodiments, a thickness of the at least one embossed portion 418 is different than a thickness of the at least one nail receiving portion 415. In some embodiments, the thickness of the at least one embossed portion 418 is greater than the thickness of the at least one nail receiving portion 415. In some embodiments, the thickness of the at least one embossed portion 418 is less than the thickness of the at least one nail receiving portion 415.

As shown in FIGS. 8 through 10, in some embodiments, the nail receiving portions 415 are circular in shape. In the embodiment that FIGS. 8 through 10 show, the nail zone 414 includes the at least one embossed portion 418.

In the embodiment that FIGS. 8 through 10 show, the nail zone 414 includes the plurality of embossed portions 418. In some embodiments, the plurality of embossed portions 418 is arranged in at least one circular pattern. In some embodiments, the plurality of embossed portions 418 is arranged in a plurality of circular patterns. In some embodiments, the plurality of circular patterns is a plurality of concentric circular patterns. In some embodiments, each of the plurality of embossed portions 418 is arc shaped. In some embodiments, the plurality of embossed portions 418 is two sets of concentric, arcuate embossed portions. In some embodiments, the plurality of embossed portions 418 is three sets of concentric, arcuate embossed portions 418. In some embodiments, the plurality of embossed portions 418 is four sets of concentric, arcuate embossed portions. In some embodiments, the plurality of embossed portions 418 is five sets of concentric, arcuate embossed portions 418. In some embodiments, the plurality of embossed portions 418 is more than five sets of concentric, arcuate embossed portions 418.

In some embodiments, each of the sets of arcuate embossed portions 418 has a different radius than the other sets of arcuate embossed portions 418. In some embodiments, there are one, two, four, five, or more than five sets of arcuate embossed portions 418. In some embodiments, the sets of arcuate embossed portions 418 have the same center point. In some embodiments, two or more sets of arcuate embossed portions 418 have different center points. In some embodiments, two or more of the arcuate embossed portions 418 are the same size. In some embodiments, two or more of the arcuate embossed portions 418 are different sizes.

In some embodiments, the roofing system 100 includes the plurality of fasteners 500. For example, as FIGS. 8 through 10 show, in some embodiments, the plurality of fasteners 500 includes at least the first fastener 501. In some embodiments, the first fastener 501 extends through the at least one nail receiving portion 415 and the roof deck 200, thereby to install the first non-asphaltic roofing shingle 410 to the roof deck 200. Although the figures show only one fastener 500 in each of the nail receiving portion 415, it is to be understood that for this embodiment, and/or any or all of the subsequently shown and described embodiments, the nail receiving portion 415 may include more than one fastener 500. In some embodiments, the fasteners 500 may include one or more of nails, screws, rivets, staples, bolts, and/or clips, and/or combinations thereof.

In some embodiments, the embossed portions 418 provide an area of stress relief on the material forming the nail receiving portions 415 and in turn stress relief on the fasteners 500, so as to prevent the shingle 410 from deforming, buckling or warping, particular in the area of the fasteners 500.

Figure 11:
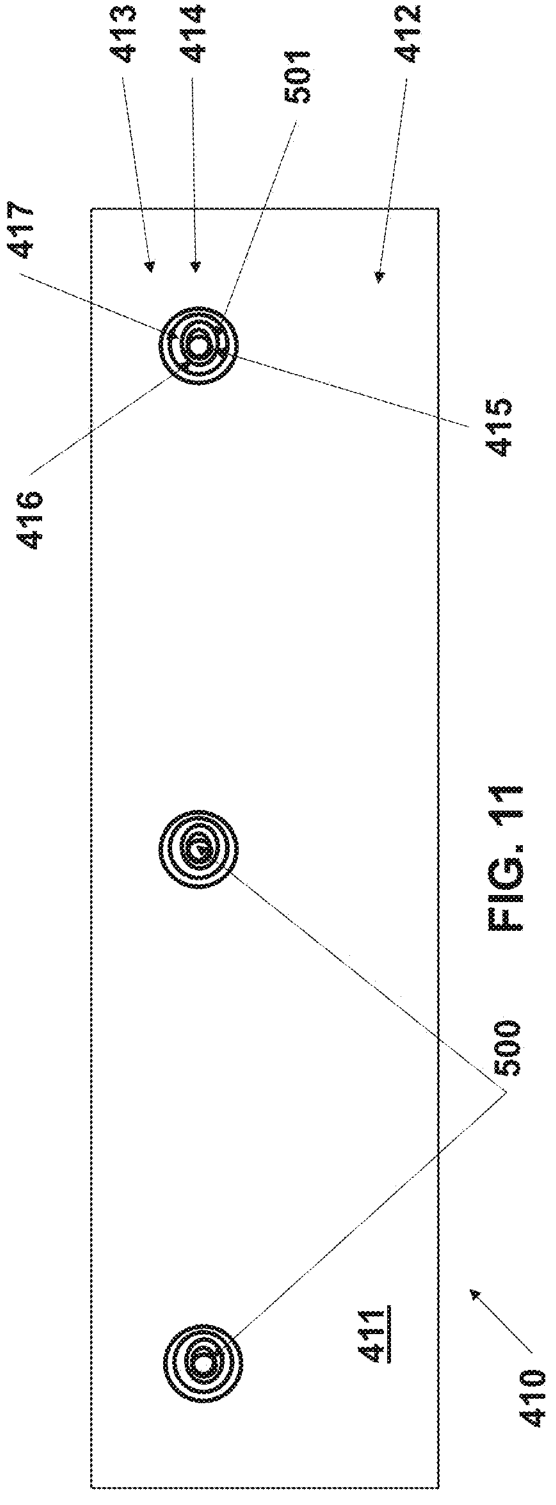
FIG. 11 shows a schematic top view of a non-asphaltic roofing shingle installed on the roof deck in the roofing system, according to some embodiments of the invention.
Figure 12:
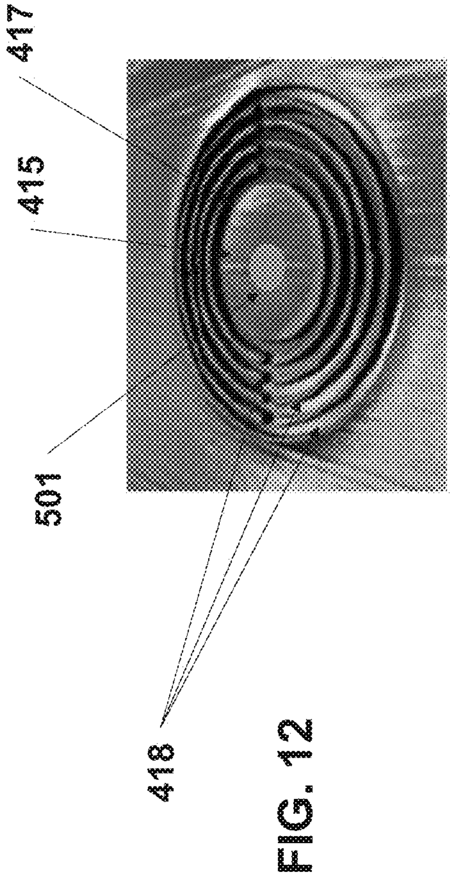
FIG. 12 shows a schematic detail view of a portion of the non-asphaltic roofing shingle of FIG. 11, according to some embodiments of the invention.

FIG. 11 shows a schematic top view of a non-asphaltic roofing shingle 410 installed on the roof deck 200 in the roofing system 100, and FIG. 12 shows a schematic detail view of a portion of the non-asphaltic roofing shingle 410 of FIG. 11, in accordance with some embodiments of the invention. In some embodiments, as the figures show, the first non-asphaltic roofing shingle 410 includes the first layer 411. In some embodiments, the first layer 411 includes the reveal portion 412, the headlap portion 413, and the nail zone 414 on the headlap portion 413. In some embodiments, the nail zone 414 includes the at least one nail receiving portion 415. In the embodiment that FIGS. 11 and 12 show, the nail zone 414 includes the plurality of embossed portions 418, and the at least one embossed portion 418 defines at least a portion of the perimeter 417 of the at least one nail receiving portion 415. In some embodiments, the thickness of the at least one embossed portion 418 is greater than the thickness of the at least one nail receiving portion 415. In some embodiments, the thickness of the at least one embossed portion 418 is less than the thickness of the at least one nail receiving portion 415.

In some embodiments, the nail zone 414 includes the plurality of embossed portions 418. In some embodiments, the plurality of embossed portions 418 is arranged in at least one circular pattern. In some embodiments, the plurality of embossed portions 418 is arranged in a plurality of circular patterns. In some embodiments, the plurality of circular patterns is a plurality of concentric circular patterns. In some embodiments, each of the plurality of embossed portions 418 is arc shaped. In some embodiments, the plurality of embossed portions 418 is two sets of concentric, arcuate embossed portions. In some embodiments, the plurality of embossed portions 418 is three sets of concentric, arcuate embossed portions 418. In some embodiments, the plurality of embossed portions 418 is four sets of concentric, arcuate embossed portions. In some embodiments, the plurality of embossed portions 418 is five sets of concentric, arcuate embossed portions 418. In some embodiments, the plurality of embossed portions 418 is more than five sets of concentric, arcuate embossed portions 418.

As shown in FIGS. 11 and 12, in some embodiments, the nail receiving portions 415 are circular in shape. In the embodiment that FIGS. 11 and 12 show, the nail zone 414 includes the at least one embossed portion 418. In some embodiments, the embossed portions 418 include five circular embossed portions 418, each of the circular embossed portions 418 having a different radius than the other embossed portions 418. In some embodiments, there are one, two, three, four, six, seven, eight, or more than eight circular embossed portions 418. In some embodiments, the circular embossed portions 418 have the same center point. In some embodiments, two or more of the circular embossed portions 418 have different center points.

In some embodiments, the nail zone 414 may include more or fewer embossed portions 418 than shown in any of the disclosed embodiments. In some embodiments, the roofing system 100 may include one or more of the non-asphaltic roofing shingles 400 in accordance with one or more of the disclosed embodiments, with or without the photovoltaic roofing shingles 300, and/or with or without one or more additional components.

In some embodiments, the embossed portions 418 provide an area of stress relief on the material forming the nail receiving portions 415 and in turn stress relief on the fasteners 500 to prevent the shingle 410 from deforming, buckling or warping, particularly in the area of the fasteners 500.

In some embodiments, the roofing shingle 410 includes at least one of the openings 416 described above and shown in FIGS. 6 through 8, and at least one of the embossed portions 418 described above and shown in FIGS. 9 and 10 and/or FIGS. 11 and 12, respectively. In some embodiments, the roofing shingle 410 includes at least one of the openings 416 and a plurality of the embossed portions 418. In some embodiments, the roofing shingle 410 includes a plurality of the openings 416 and at least one of the embossed portions 418.

In some embodiments, at least one or more of the nail receiving portions 415 of the roofing shingle 410 includes features of one of the openings 416 as described above and features of one of the embossed portions 418 described above. In some embodiments, the nail receiving portions 415 include one or more patterns of the openings 416 and one or more patterns of the embossed portions 418. In some embodiments, the pattern may include one or more of the openings 416 in one or more of the concentric rings, and one or more of the embossed portions 418 in one or more another of the concentric rings. In some embodiments, one of the rings may include both the openings 416 and the embossed portions 418. In some embodiments, the openings 416 and the embossed portions 418 have alternating positions in the ring. In some embodiments, the pattern may include alternating rings of the openings 416 and the embossed portions 418.

In some embodiments, the roofing shingle 410 includes at least one of the embossed portions 418 described above and shown in FIGS. 9 and 10 and at least one of the embossed portions described above and shown in FIGS. 11 and 12, respectively.

Figure 13:
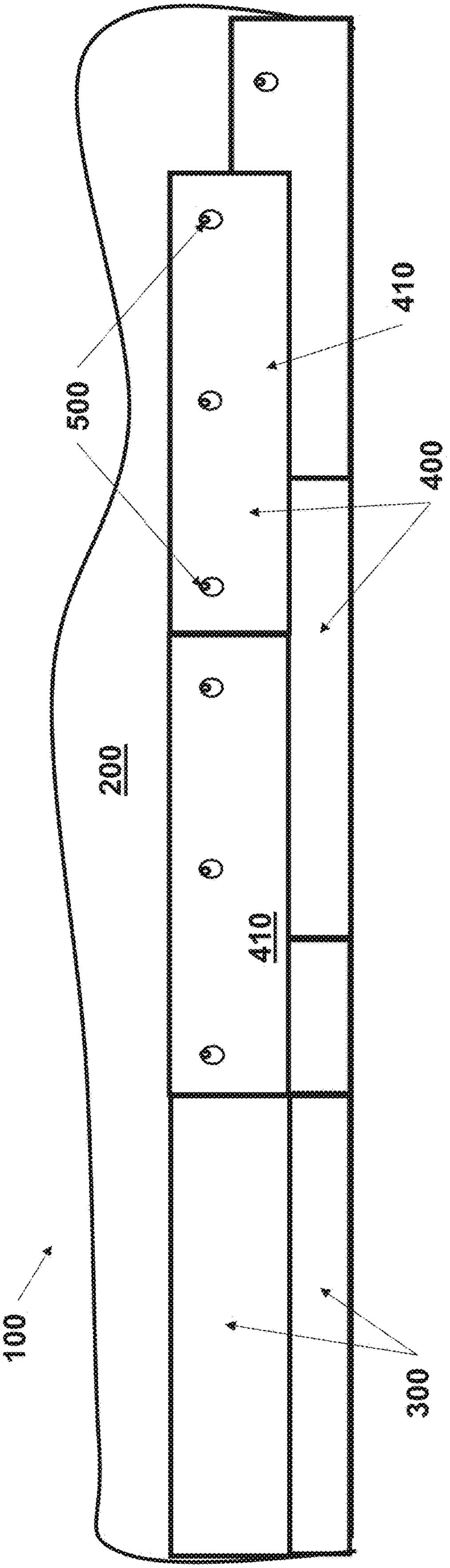
FIG. 13 shows a schematic top view of a roofing system including a partially-roofed roof deck, according to some embodiments of the invention.
Figure 14:
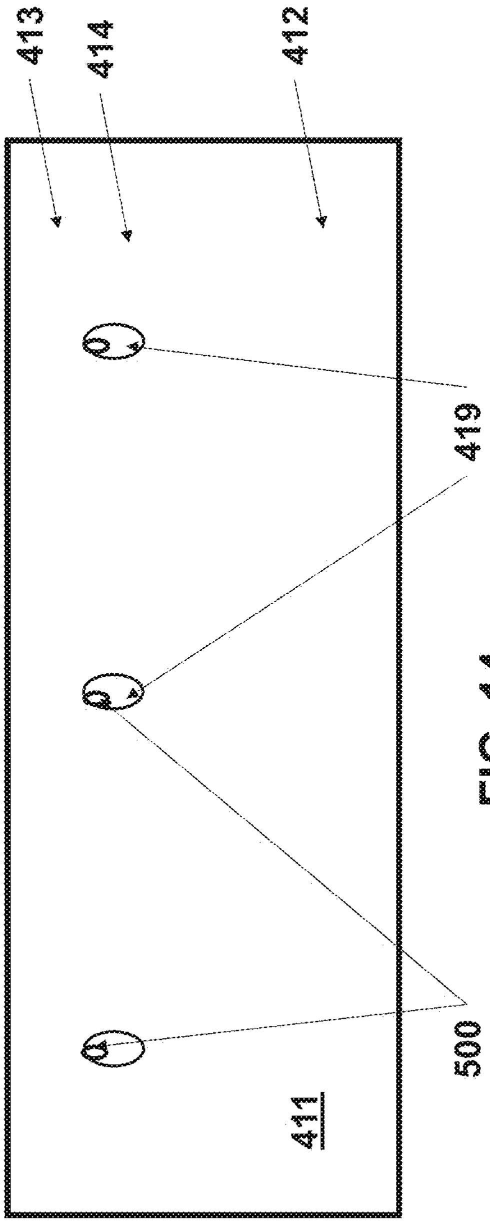
FIG. 14 shows a schematic top view of a non-asphaltic roofing shingle of the roofing system of FIG. 13, according to some embodiments of the invention.
Figure 15:
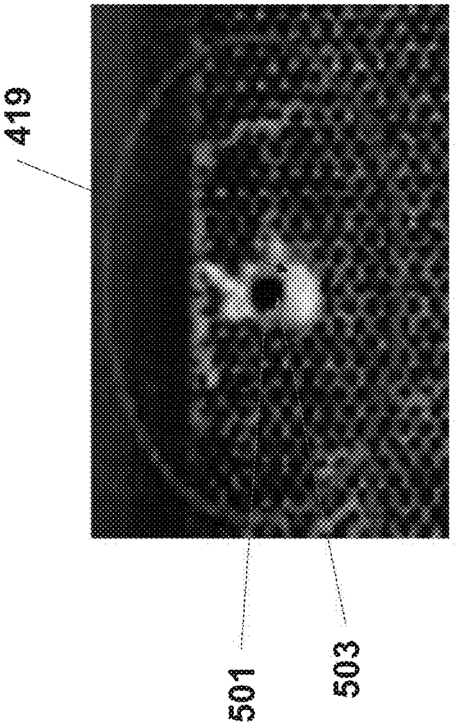
FIG. 15 shows a schematic detail view of a portion of the non-asphaltic roofing shingle of FIGS. 13 and 14, according to some embodiments of the invention.

FIG. 13 shows a schematic top view of a roofing system including a partially-roofed roof deck, FIG. 14 shows a schematic top view of a non-asphaltic roofing shingle 410 of the roofing system of FIG. 13, and FIG. 15 shows a schematic detail view of a portion of the non-asphaltic roofing shingle 410 of FIGS. 13 and 14, in accordance with some embodiments. As the figures show, in some embodiments, the roofing system 100 includes the roof deck 200. In some embodiments, as FIGS. 13 through 15 show, the roofing system includes the plurality of photovoltaic roofing shingles 300 installed on the roof deck 200. In some embodiments, the roofing system includes the plurality of non-asphaltic roofing shingles 400 installed on the roof deck 200, adjacent to the plurality of photovoltaic roofing shingles 300. As discussed, however, in some embodiments, the roofing system 100 omits either the plurality of photovoltaic roofing shingles 300 and/or the plurality of non-asphaltic roofing shingles 400. Further, in some embodiments, the roofing system 100 includes one or more other components in place of and/or in addition to either or both of the plurality of photovoltaic roofing shingles 300 and/or the plurality of non-asphaltic roofing shingles 400.

As FIGS. 13 through 15 illustrate, the plurality of non-asphaltic roofing shingles 400 includes at least the first non-asphaltic roofing shingle 410. In some embodiments, the first non-asphaltic roofing shingle 410 includes the first layer 411. In some embodiments, the first layer 411 includes the reveal portion 412, the headlap portion 413, and the nail zone 414 on the headlap portion 413, as discussed. In some embodiments, the nail zone 414 includes the at least one nail receiving opening 419, as further described.

In some embodiments, the roofing system 100 includes the plurality of fasteners 500. For example, as FIGS. 13 through 15 show, in some embodiments, the plurality of fasteners 500 includes at least the first fastener 501. In some embodiments, the first fastener 501 includes a head 503 connected to a shaft. In some embodiments, at least a portion of the head 503 contacts a surface of the first non-asphaltic roofing shingle 410. In some embodiments, at least a portion of the head 503 contacts a surface of the nail zone 414. In some embodiments, the shaft of the first fastener 501 extends through the at least one nail receiving opening 419 and into the roof deck 200, thereby installing the first non-asphaltic roofing shingle 410 to the roof deck 200. In some embodiments, a size, such as a width or diameter, of the at least one nail receiving opening 419 is greater than a size, such as a width or diameter, of the shaft of the first fastener 501, such that at least a portion of a perimeter of the at least one nail receiving opening 419 is spaced apart from the shaft of the first fastener 501. In some embodiments, the at least one nail receiving opening 419 is present in the first non-asphaltic roofing shingle 410 prior to penetrating the first non-asphaltic roofing shingle 410 with the first fastener 501—that is, the first fastener 501 does not form the at least one nail receiving opening 419 in the first non-asphaltic roofing shingle 410.

As discussed, although the figures show three nail receiving openings 419, one or more of the non-asphaltic roofing shingles, such as but not limited to the non-asphaltic roofing shingles 400 and/or the first non-asphaltic roofing shingle 410, may include one, two, three, four, five, six, seven, eight, or more than eight nail receiving openings 419. Also as discussed, although the figures show only one fastener 500 in each of the nail receiving openings 419, in some embodiments one or more of the nail receiving openings 419 includes more than one fastener 500. In some embodiments, the fasteners 500 include one or more of nails, screws, rivets, staples, bolts, and/or clips, and/or combinations thereof.

Figure 16:
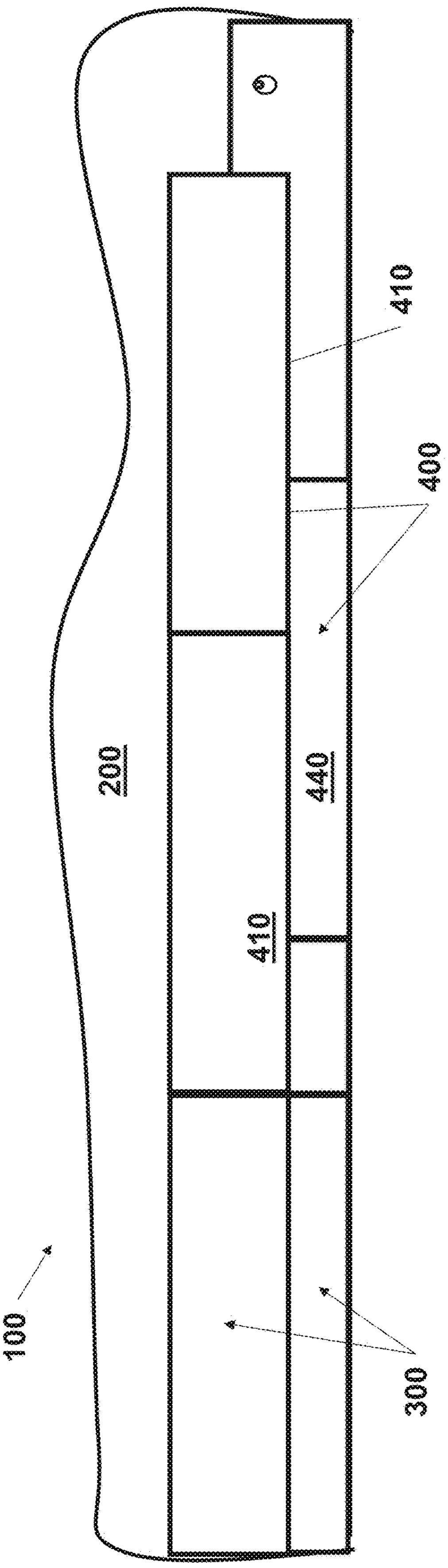
FIG. 16 shows a schematic top view of a roofing system including a partially-roofed roof deck, according to some embodiments of the invention.
Figure 18:
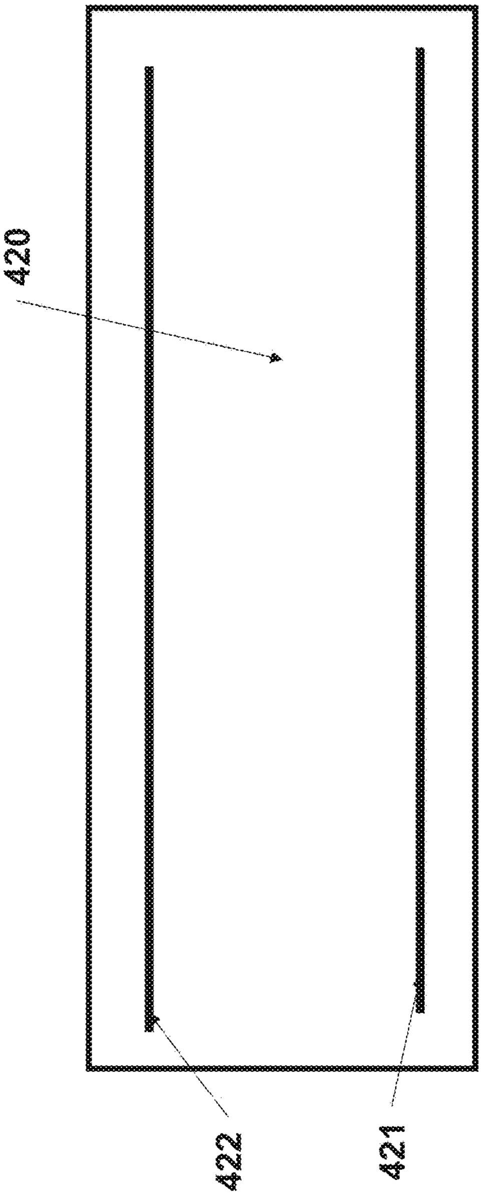
FIG. 18 shows a schematic bottom view of the non-asphaltic roofing shingle of FIG. 16 and FIG. 17, according to some embodiments of the invention.
Figure 17:
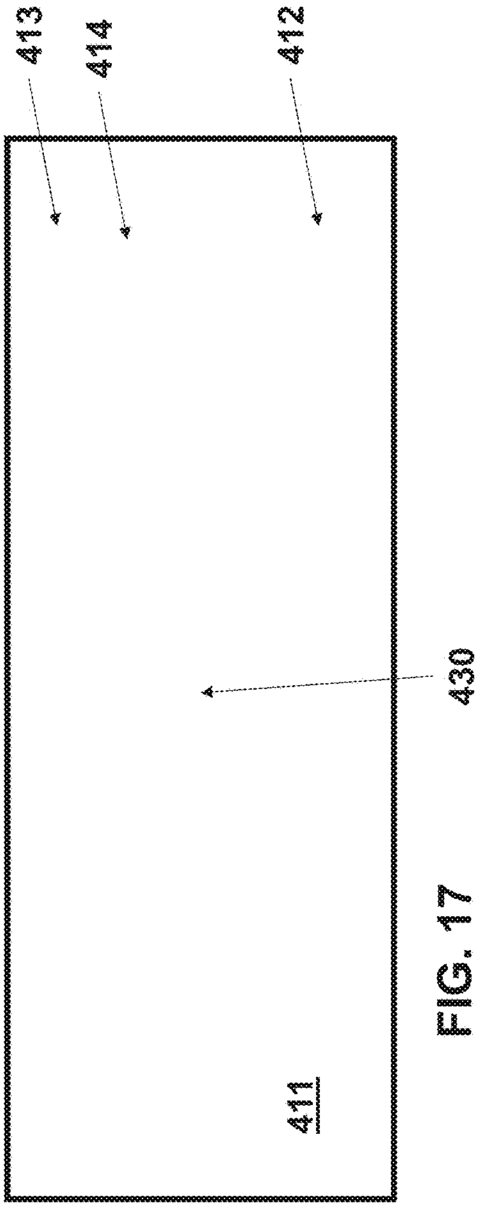
FIG. 17 shows a schematic top view of a non-asphaltic roofing shingle of the roofing system of FIG. 16, according to some embodiments of the invention.
Figure 19:
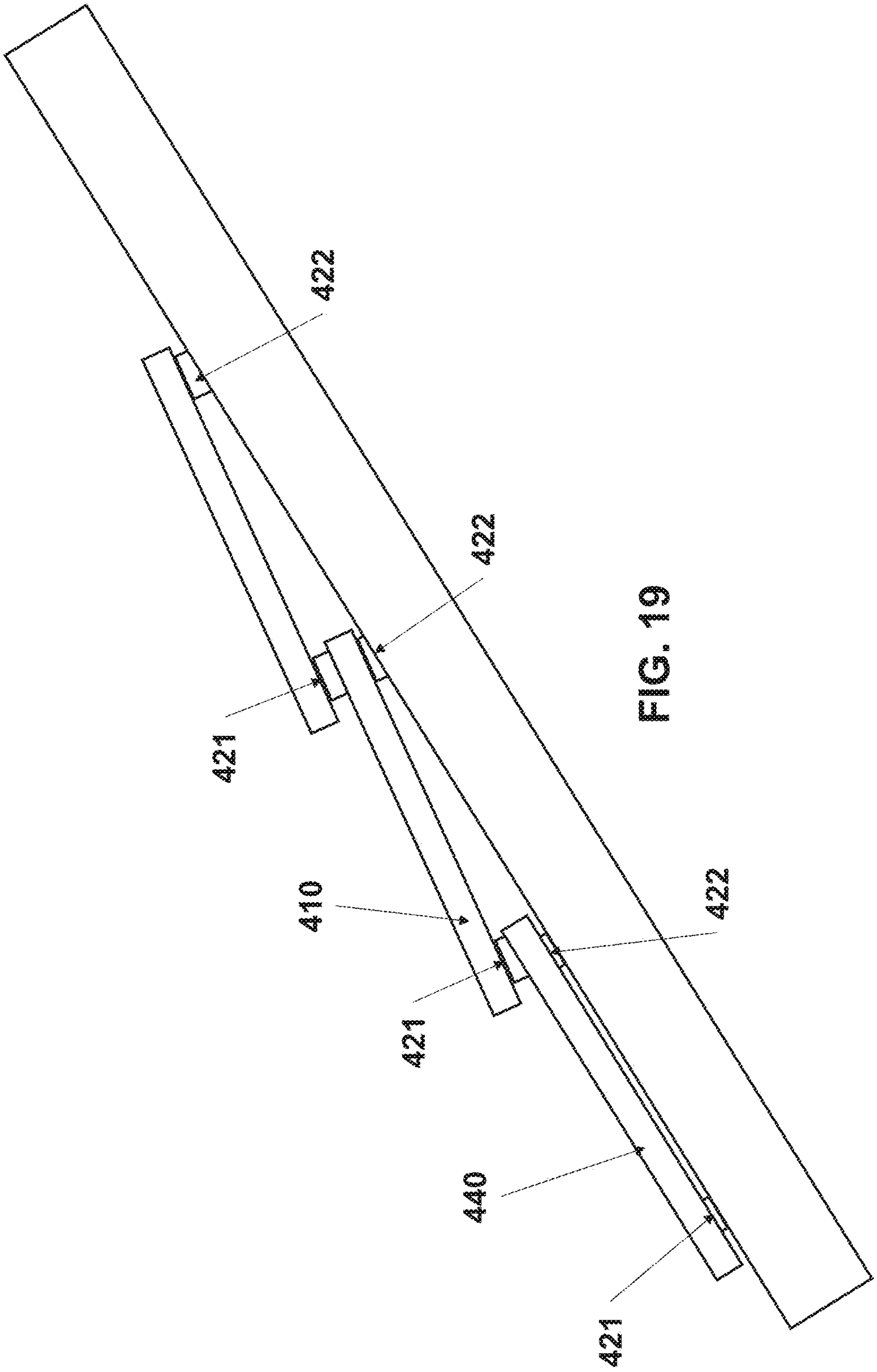
FIG. 19 shows a schematic side view of the roofing system and non-asphaltic roofing shingle of FIGS. 16 through 18, according to some embodiments of the invention.

FIG. 16 shows a schematic top view of a roofing system including a partially-roofed roof deck, FIG. 17 shows a schematic top view of a non-asphaltic roofing shingle 410 of the roofing system of FIG. 16, FIG. 18 shows a schematic bottom view of the non-asphaltic roofing shingle 410 of FIG. 16 and FIG. 17, and FIG. 19 shows a schematic side view of the non-asphaltic roofing shingle 410 of FIGS. 16 through 18, in accordance with some embodiments. As the figures show, in some embodiments, the roofing system 100 includes the roof deck 200, as discussed. In some embodiments, as the figures show, the roofing system includes the plurality of photovoltaic roofing shingles 300 installed on the roof deck 200. In some embodiments, the roofing system includes the plurality of non-asphaltic roofing shingles 400 installed on the roof deck 200, adjacent to the plurality of photovoltaic roofing shingles 300. It is to be understood, however, that in some embodiments, the roofing system 100 omits either the plurality of photovoltaic roofing shingles 300 and/or the plurality of non-asphaltic roofing shingles 400. Further, in some embodiments, the roofing system 100 includes one or more other components in place of and/or in addition to either or both of the plurality of photovoltaic roofing shingles 300 and/or the plurality of non-asphaltic roofing shingles 400.

As FIGS. 16 through 19 illustrate, as discussed the plurality of non-asphaltic roofing shingles 400 includes at least the first non-asphaltic roofing shingle 410 and a second non-asphaltic roofing shingle 440. In some embodiments, each of the non-asphaltic roofing shingles 400 includes the first layer 411. In some embodiments, the first layer 411 includes the reveal portion 412, and the headlap portion 413.

In some embodiments, as shown in FIGS. 16 through 19, each of the non-asphaltic roofing shingles 400 includes a first surface 420 (e.g., a bottom or lowermost surface when installed on the roof deck 200) and a second surface 430 (e.g., a top or uppermost surface when installed on the roof deck 200), where the first surface 420 and the second surface 430 are opposite one another. In some embodiments, the reveal portion 412 and the headlap portion 413 are formed on the second surface 430 of the non-asphaltic roofing shingle 400.

In some embodiments, each of the non-asphaltic roofing shingles 400 includes a first adhesive line 421 and a second adhesive line 422 on the first surface 420—that is, on a bottom surface of the non-asphaltic roofing shingles 400 that is closer to the roof deck 200 than the opposite surface of the non-asphaltic roofing shingles 400.

As shown in FIG. 19, in some embodiments, the first adhesive line 421 of the first non-asphaltic roofing shingle 410 adheres to the second non-asphaltic roofing shingle 440. In some embodiments, the second adhesive line 422 of the first non-asphaltic roofing shingle 410 adheres to the roof deck 200. In some embodiments, the second adhesive line 422 of the second non-asphaltic roofing shingle 440 adheres to the roof deck 200.

In some embodiments, as the figures show, both of the first adhesive line 421 and the second adhesive line 422 is a continuous line of adhesive. In some embodiments, either or both of the first adhesive line 421 and/or the second adhesive line 422 includes a discontinuous line of adhesive. In some embodiments, either or both of the first adhesive line 421 and/or the second adhesive line 422 includes a plurality of adhesive line segments. In some embodiments, either or both of the first adhesive line 421 and/or the second adhesive line 422 includes two adhesive line segments. In some embodiments, either or both of the first adhesive line 421 and/or the second adhesive line 422 includes three adhesive line segments. In some embodiments, either or both of the first adhesive line 421 and/or the second adhesive line 422 includes four adhesive line segments. In some embodiments, either or both of the first adhesive line 421 and/or the second adhesive line 422 includes five adhesive line segments. In some embodiments, either or both of the first adhesive line 421 and/or the second adhesive line 422 includes six adhesive line segments. In some embodiments, either or both of the first adhesive line 421 and/or the second adhesive line 422 includes seven adhesive line segments. In some embodiments, either or both of the first adhesive line 421 and/or the second adhesive line 422 includes eight adhesive line segments. In some embodiments, either or both of the first adhesive line 421 and/or the second adhesive line 422 includes nine adhesive line segments. In some embodiments, either or both of the first adhesive line 421 and/or the second adhesive line 422 includes ten adhesive line segments. In some embodiments, either or both of the first adhesive line 421 and/or the second adhesive line 422 includes more than ten adhesive line segments.

In some embodiments, as the figures show, both of the first adhesive line 421 and/or the second adhesive line 422 is a straight line. In some embodiments, either or both of the first adhesive line 421 and/or the second adhesive line 422 is different shape, such as but not limited to an arcuate shape, a curve, or another shape.

In some embodiments, either or both of the first adhesive line 421 and/or the second adhesive line 422 includes one or more of a butyl adhesive, bitumen-based sealant, polymer-modified bitumen sealant, chloroform adhesive, acrylic adhesive, polyurethane adhesive, epoxy, solvent-based adhesive, emulsion adhesive, cyanoacrylate, and combinations thereof.

Figure 20:
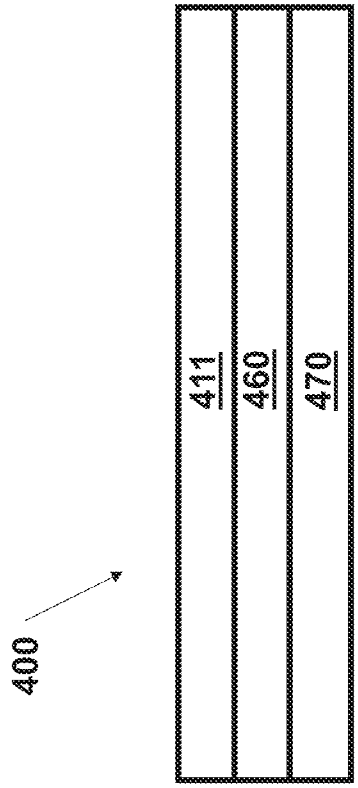
FIG. 20 shows a schematic cross-sectional view of a non-asphaltic roofing shingle, according to some embodiments of the invention.

FIG. 20 shows a schematic cross-sectional view of a non-asphaltic roofing shingle 400, in accordance with some embodiments of the invention. As shown in FIG. 20, in some embodiments the non-asphaltic roofing shingle 400 includes a multilayer construction. In some embodiments, the non-asphaltic roofing shingle 400 includes the first layer 411, a second layer 460, and a third layer 470, where the second layer 460 is between the first layer 411 and the third layer 470.

In some embodiments, at least one of the first layer 411, the second layer 460, and/or the third layer 470 includes a material with a shear modulus of at least 0.1 GPa at room temperature. In some embodiments, the material includes, but is not limited to, at least one of a glass-reinforced epoxy laminate, a metal, a basalt reinforced scrim, and/or a polymer, and/or combinations thereof.

In some embodiments, at least the first layer 411 includes the material. In some embodiment, at least the second layer 460 includes the material. In some embodiments, at least the third layer 470 includes the material. In some embodiments, another layer of the non-asphaltic roofing shingle 400 includes the material.

In some embodiments, the first layer 411 is composed of a polymeric material. In some embodiments, the first layer 411 is composed of polyethylene terephthalate ("PET"). In another embodiment, the first layer 411 is composed of ethylene tetrafluoroethylene ("ETFE"). In some embodiments, the first layer 411 is composed of an acrylic such as polymethyl methacrylate ("PMMA"). In some embodiments, the first layer 411 is composed of thermoplastic polyolefin (TPO). In some embodiments, the first layer 411 is composed of a single ply TPO roofing membrane. In other embodiments, non-limiting examples of TPO membranes are disclosed in U.S. Pat. No. 9,359,014 to Yang et al., which is incorporated by reference herein in its entirety. In another embodiment, the first layer 411 is composed of includes polyvinyl chloride. In some embodiments, the first layer 411 is composed of ethylene propylene diene monomer (EPDM) rubber. In some embodiments, the first layer 411 is includes a flame retardant additive. In some embodiments, the flame retardant additive may be clays, nanoclays, silicas, carbon black, metal hydroxides such as aluminum hydroxide, metal foils, graphite, and combinations thereof. In some embodiments, the first layer 411 is composed of a UV resistant material. In some embodiments, the first layer 411 includes a UV resistant coating. In some embodiments, the first layer 411 is composed of a water resistant material. In some embodiments, the first layer 411 is composed of asphalt. In some embodiments, the first layer 411 is composed of metal. In some embodiments, the first layer 411 is composed of aluminum. In some embodiments, the first layer 411 is composed of steel. In some embodiments, the first layer 411 is composed of copper.

In some embodiments, the second layer 460 is composed of one or more of the above-referenced materials as those of the first layer 411. In some embodiments, the third layer 470 is composed of one or more of the above-referenced materials as those of the first layer 411. In some embodiments, the roofing shingle 410 incudes the first layer 411 and the second layer 460. In some embodiments, the first layer 411 is composed of TPO and the second layer 460 is composed of TPO.

In some embodiments, the material has a shear modulus of greater than 0.05 GPa. In some embodiments, the material has a shear modulus of greater than 0.06 GPa. In some embodiments, the material has a shear modulus of greater than 0.07 GPa. In some embodiments, the material has a shear modulus of greater than 0.08 GPa. In some embodiments, the material has a shear modulus of greater than 0.09 GPa. In some embodiments, the material has a shear modulus of greater than 0.1 GPa. In some embodiments, the material has a shear modulus of greater than 0.11 GPa. In some embodiments, the material has a shear modulus of greater than 0.12 GPa. In some embodiments, the material has a shear modulus of greater than 0.13 GPa. In some embodiments, the material has a shear modulus of greater than 0.14 GPa. In some embodiments, the material has a shear modulus of greater than 0.15 GPa. In some embodiments, the material has a shear modulus of greater than 0.2 GPa.

In some embodiments, the material has a shear modulus of at least 0.05 GPa. In some embodiments, the material has a shear modulus of at least 0.06 GPa. In some embodiments, the material has a shear modulus of at least 0.07 GPa. In some embodiments, the material has a shear modulus of at least 0.08 GPa. In some embodiments, the material has a shear modulus of at least 0.09 GPa. In some embodiments, the material has a shear modulus of at least 0.1 GPa. In some embodiments, the material has a shear modulus of at least 0.11 GPa. In some embodiments, the material has a shear modulus of at least 0.12 GPa. In some embodiments, the material has a shear modulus of at least 0.13 GPa. In some embodiments, the material has a shear modulus of at least 0.14 GPa. In some embodiments, the material has a shear modulus of at least 0.15 GPa. In some embodiments, the material has a shear modulus of at least 0.2 GPa.

In some embodiments, the material has a shear modulus of less than 0.05 GPa. In some embodiments, the material has a shear modulus of less than 0.06 GPa. In some embodiments, the material has a shear modulus of less than 0.07 GPa. In some embodiments, the material has a shear modulus of less than 0.08 GPa. In some embodiments, the material has a shear modulus of less than 0.09 GPa. In some embodiments, the material has a shear modulus of less than 0.1 GPa. In some embodiments, the material has a shear modulus of less than 0.11 GPa. In some embodiments, the material has a shear modulus of less than 0.12 GPa. In some embodiments, the material has a shear modulus of less than 0.13 GPa. In some embodiments, the material has a shear modulus of less than 0.14 GPa. In some embodiments, the material has a shear modulus of less than 0.15 GPa. In some embodiments, the material has a shear modulus of less than 0.2 GPa.

In some embodiments, one or more of the non-asphaltic roofing shingles 400 in any of the previously-described embodiments includes the multilayer construction that FIG. 20 shows. In some embodiments, one or more of the photovoltaic roofing shingles 300 includes the multilayer construction that FIG. 20 shows.

Figure 21:
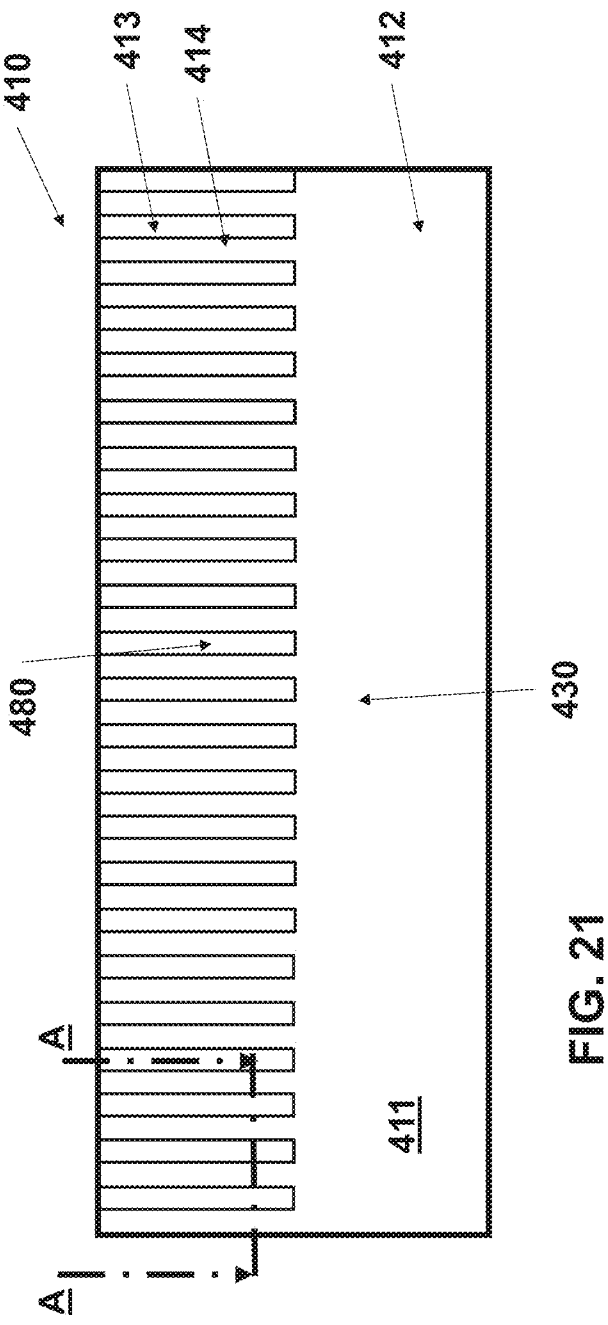
FIG. 21 shows a schematic cross-sectional view of a non-asphaltic roofing shingle, according to some embodiments of the invention.
Figure 22:
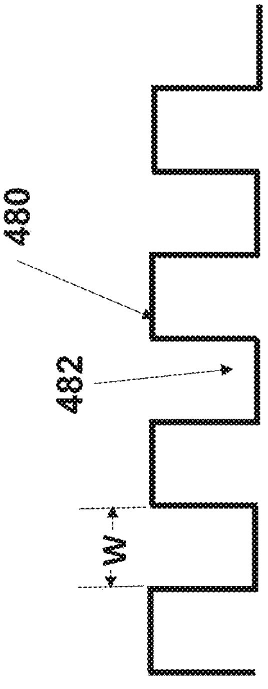
FIG. 22 shows a schematic cross-sectional view taken along line A-A, in the direction of the arrows, of the non-asphaltic shingle of FIG. 21, according to some embodiments of the invention.

FIG. 21 shows a schematic cross-sectional view of a non-asphaltic roofing shingle 410, and FIG. 22 shows a schematic cross-sectional view taken along line A-A, in the direction of the arrows, of the non-asphaltic shingle of FIG. 21, in accordance with some embodiments of the invention. As FIG. 21 shows, as discussed, in some embodiments the first non-asphaltic roofing shingle 410 includes the first layer 411. In some embodiments, the first layer 411 includes the reveal portion 412, the headlap portion 413, and the nail zone 414 on the headlap portion 413. Also as discussed, as FIG. 21 illustrates, the non-asphaltic roofing shingle 410 includes the second surface 430 (e.g., the top or uppermost surface when installed on the roof deck 200). In some embodiments, the reveal portion 412 and the headlap portion 413 are formed on the second surface 430 of the first non-asphaltic roofing shingle 410. In some embodiments, the first non-asphaltic roofing shingle 410 includes any of the above-discussed nail receiving portions 415 in the nail zone 414 in FIGS. 1 through 15, including any of the openings 416, the embossed portions 418, the openings 419, or combinations thereof.

As FIGS. 21 and 22 show, the non-asphaltic roofing shingle 400 includes a plurality of ribs 480. In some embodiments, the plurality of ribs 480 are formed by embossing. In some embodiments, spaces 482 are located between adjacent ones of the plurality of ribs 480. In some embodiments, a width W of each of the spaces 482 between the corresponding adjacent ribs is 1 mm. In some embodiments, the width W is 2 mm. In some embodiments, the width W is 3 mm. In some embodiments, the width W is 4 mm. In some embodiments, the width W is 5 mm. In some embodiments, the width W is 6 mm. In some embodiments, the width W is 7 mm. In some embodiments, the width W is 8 mm. In some embodiments, the width W is 9 mm. In some embodiments, the width W is 10 mm. In some embodiments, the width W is 11 mm. In some embodiments, the width W is 12 mm. In some embodiments, the width W is 13 mm. In some embodiments, the width W is 14 mm. In some embodiments, the width W is 15 mm.

In some embodiments, the width W is 1 mm to 15 mm. In some embodiments, the width W is 2 mm to 15 mm. In some embodiments, the width W is 3 mm to 15 mm. In some embodiments, the width W is 4 mm to 15 mm. In some embodiments, the width W is 5 mm to 15 mm. In some embodiments, the width W is 6 mm to 15 mm. In some embodiments, the width W is 7 mm to 15 mm. In some embodiments, the width W is 8 mm to 15 mm. In some embodiments, the width W is 9 mm to 15 mm. In some embodiments, the width W is 10 mm to 15 mm. In some embodiments, the width W is 11 mm to 15 mm. In some embodiments, the width W is 12 mm to 15 mm. In some embodiments, the width W is 13 mm to 15 mm. In some embodiments, the width W is 14 mm to 15 mm.

In some embodiments, the width W is 1 mm to 14 mm. In some embodiments, the width W is 2 mm to 14 mm. In some embodiments, the width W is 3 mm to 14 mm. In some embodiments, the width W is 4 mm to 14 mm. In some embodiments, the width W is 5 mm to 14 mm. In some embodiments, the width W is 6 mm to 14 mm. In some embodiments, the width W is 7 mm to 14 mm. In some embodiments, the width W is 8 mm to 14 mm. In some embodiments, the width W is 9 mm to 14 mm. In some embodiments, the width W is 10 mm to 14 mm. In some embodiments, the width W is 11 mm to 14 mm. In some embodiments, the width W is 12 mm to 14 mm. In some embodiments, the width W is 13 mm to 14 mm.

In some embodiments, the width W is 1 mm to 13 mm. In some embodiments, the width W is 2 mm to 13 mm. In some embodiments, the width W is 3 mm to 13 mm. In some embodiments, the width W is 4 mm to 13 mm. In some embodiments, the width W is 5 mm to 13 mm. In some embodiments, the width W is 6 mm to 13 mm. In some embodiments, the width W is 7 mm to 13 mm. In some embodiments, the width W is 8 mm to 13 mm. In some embodiments, the width W is 9 mm to 13 mm. In some embodiments, the width W is 10 mm to 13 mm. In some embodiments, the width W is 11 mm to 13 mm. In some embodiments, the width W is 12 mm to 13 mm.

In some embodiments, the width W is 1 mm to 12 mm. In some embodiments, the width W is 2 mm to 12 mm. In some embodiments, the width W is 3 mm to 12 mm. In some embodiments, the width W is 4 mm to 12 mm. In some embodiments, the width W is 5 mm to 12 mm. In some embodiments, the width W is 6 mm to 12 mm. In some embodiments, the width W is 7 mm to 12 mm. In some embodiments, the width W is 8 mm to 12 mm. In some embodiments, the width W is 9 mm to 12 mm. In some embodiments, the width W is 10 mm to 12 mm. In some embodiments, the width W is 11 mm to 12 mm.

In some embodiments, the width W is 1 mm to 11 mm. In some embodiments, the width W is 2 mm to 11 mm. In some embodiments, the width W is 3 mm to 11 mm. In some embodiments, the width W is 4 mm to 11 mm. In some embodiments, the width W is 5 mm to 11 mm. In some embodiments, the width W is 6 mm to 11 mm. In some embodiments, the width W is 7 mm to 11 mm. In some embodiments, the width W is 8 mm to 11 mm. In some embodiments, the width W is 9 mm to 11 mm. In some embodiments, the width W is 10 mm to 11 mm.

In some embodiments, the width W is 1 mm to 10 mm. In some embodiments, the width W is 2 mm to 10 mm. In some embodiments, the width W is 3 mm to 10 mm. In some embodiments, the width W is 4 mm to 10 mm. In some embodiments, the width W is 5 mm to 10 mm. In some embodiments, the width W is 6 mm to 10 mm. In some embodiments, the width W is 7 mm to 10 mm. In some embodiments, the width W is 8 mm to 10 mm. In some embodiments, the width W is 9 mm to 10 mm.

In some embodiments, the width W is 1 mm to 9 mm. In some embodiments, the width W is 2 mm to 9 mm. In some embodiments, the width W is 3 mm to 9 mm. In some embodiments, the width W is 4 mm to 9 mm. In some embodiments, the width W is 5 mm to 9 mm. In some embodiments, the width W is 6 mm to 9 mm. In some embodiments, the width W is 7 mm to 9 mm. In some embodiments, the width W is 8 mm to 9 mm. In some embodiments, the width W is 1 mm to 8 mm. In some embodiments, the width W is 2 mm to 8 mm. In some embodiments, the width W is 3 mm to 8 mm. In some embodiments, the width W is 4 mm to 8 mm. In some embodiments, the width W is 5 mm to 8 mm. In some embodiments, the width W is 6 mm to 8 mm. In some embodiments, the width W is 7 mm to 8 mm.

In some embodiments, the width W is 1 mm to 7 mm. In some embodiments, the width W is 2 mm to 7 mm. In some embodiments, the width W is 3 mm to 7 mm. In some embodiments, the width W is 4 mm to 7 mm. In some embodiments, the width W is 5 mm to 7 mm. In some embodiments, the width W is 6 mm to 7 mm. In some embodiments, the width W is 1 mm to 6 mm. In some embodiments, the width W is 2 mm to 6 mm. In some embodiments, the width W is 3 mm to 6 mm. In some embodiments, the width W is 4 mm to 6 mm. In some embodiments, the width W is 5 mm to 6 mm. In some embodiments, the width W is 1 mm to 5 mm. In some embodiments, the width W is 2 mm to 5 mm. In some embodiments, the width W is 3 mm to 5 mm. In some embodiments, the width W is 4 mm to 5 mm. In some embodiments, the width W is 1 mm to 4 mm. In some embodiments, the width W is 2 mm to 4 mm. In some embodiments, the width W is 3 mm to 4 mm. In some embodiments, the width W is 1 mm to 3 mm. In some embodiments, the width W is 2 mm to 3 mm. In some embodiments, the width W is 1 mm to 2 mm.

In some embodiments, each of the ribs 480 has a rectangular-shaped cross section. In some embodiments, each of the ribs 480 has a square-shaped cross section. In some embodiments, each of the ribs 480 has a triangular-shaped cross section. In some embodiments, each of the ribs 480 has a circular-shaped cross section. In some embodiments, each of the ribs 480 has a semi-circular-shaped cross section. In some embodiments, each of the ribs 480 has an elliptical-shaped cross section. In some embodiments, each of the ribs 480 has an oval-shaped cross section. In some embodiments, each of the ribs 480 has a V-shaped cross section. In some embodiments, the spaces 482 have corresponding cross-sectional shapes as those of the ribs 480. In some embodiments, the spaces 482 have different sizes and shapes from those of the ribs 480.

In some embodiments, the spaces 482 provide open areas for stress relief on the material of the nail receiving portion 415 and in turn stress relief on the fastener 500, so as to prevent the shingle 410 from deforming, buckling or warping, particularly in the area of the fasteners 500. In some embodiments, the fasteners 500 do not constrain the free thermal expansion of the material of the roofing shingle 410.

Although the figures show non-asphaltic shingles installed on roof decks in stair-step configurations, it is to be understood that in embodiments of the invention, the non-asphaltic shingles may be installed in other configurations, such as in columnar configurations. Further, although the figures show photovoltaic roofing shingles installed on roof decks in columnar configurations, it is to be understood that in embodiments of the invention, the photovoltaic roofing shingles may be installed in other configurations, such as stair-step configurations.

Variations, modifications, and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

What is claimed is:

1. A system, comprising:

a plurality of photovoltaic shingles installed on a roof deck; and a plurality of roofing shingles installed on the roof deck proximate the plurality of photovoltaic shingles, wherein each of the plurality of roofing shingles includes a headlap portion, wherein the headlap portion includes an upper surface and a lower surface opposite the upper surface, and a nail zone on the headlap portion, wherein the nail zone includes at least one nail receiving portion, and at least one opening defining a perimeter of at least a portion of the at least one nail receiving portion, wherein the at least one opening extends from the upper surface to the lower surface, wherein each of the plurality of roofing shingles is installed on the roof deck by at least one fastener, and wherein the at least one fastener extends through the at least one nail receiving portion.

2. The system of claim 1, wherein the at least one opening comprises a plurality of openings.

3. The system of claim 1, wherein the at least one opening comprises at least a first opening and a second opening.

4. The system of claim 1, wherein the at least one nail receiving portion has a circular shape.

5. The system of claim 4, wherein the at least one opening includes a first plurality of openings arranged in a first circular pattern.

6. The system of claim 5, wherein the at least one opening includes a second plurality of openings arranged in a second circular pattern, and wherein the first circular pattern and the second circular pattern are concentric with one another.

7. The system of claim 6, wherein the second circular pattern surrounds the first circular pattern, and wherein the first circular pattern surrounds the at least one nail receiving portion.

8. The system of claim 6, wherein each of the first plurality of openings and each of the second plurality of openings is arcuate-shaped.

9. The system of claim 6, wherein the at least one opening includes a third plurality of openings arranged in a third circular pattern, and wherein the first circular pattern, the second circular pattern, and the third circular pattern are concentric with one another.

10. The system of claim 9, wherein the third circular pattern surrounds the second circular pattern.

11. The system of claim 5, wherein the at least one nail receiving portion is on the upper surface.

12. The system of claim 1, wherein each of the plurality of roofing shingles is composed of a polymer.

13. The system of claim 12, wherein each of the plurality of roofing shingles is composed of thermoplastic polyolefin (TPO).

14. The system of claim 1, wherein each of the plurality of roofing shingles is composed of metal.

15. A system, comprising:
a plurality of photovoltaic shingles installed on a roof deck; and
a plurality of roofing shingles installed on the roof deck proximate the plurality of photovoltaic shingles,
wherein each of the plurality of roofing shingles includes
a headlap portion,
wherein the headlap portion includes an upper surface and a lower surface opposite the upper surface, and
a plurality of ribs on the headlap portion, and
a nail zone on the headlap portion proximate to the plurality of ribs,
wherein the nail zone includes
at least one nail receiving portion, and
at least one opening defining a perimeter of at least a portion of the at least one nail receiving portion,
wherein the at least one opening extends from the upper surface to the lower surface,
wherein each of the plurality of roofing shingles is installed on the roof deck by at least one fastener, and
wherein the at least one fastener extends through the at least one nail receiving portion.

16. The system of claim 15, wherein the at least one opening comprises a plurality of openings.

17. The system of claim 16, wherein the first plurality of openings is arranged in a first circular pattern.

18. A system, comprising:
a plurality of photovoltaic shingles installed on a roof deck; and
a plurality of roofing shingles installed on the roof deck proximate the plurality of photovoltaic shingles,
wherein each of the plurality of roofing shingles includes
an upper surface and a lower surface,
a headlap portion, and
a nail zone on the headlap portion,
wherein the nail zone includes
at least one nail receiving portion,
at least one opening defining at least a first portion of a perimeter of at least a first portion of the at least one nail receiving portion,
wherein the at least one opening extends from the upper surface to the lower surface, and
at least one embossed portion within the upper surface defining at least a second portion of the perimeter of at least a second portion of the at least one nail receiving portion,
wherein each of the plurality of roofing shingles is installed on the roof deck by at least one fastener, and
wherein the at least one fastener extends through the at least one nail receiving portion.

19. The system of claim 18, wherein the at least one opening comprises a plurality of openings.

20. The system of claim 19, wherein the first plurality of openings is arranged in a first circular pattern.

* * * * *